(12) United States Patent
Phoutchanthavongsa et al.

(10) Patent No.: US 11,644,962 B2
(45) Date of Patent: May 9, 2023

(54) WIDGET CONFIGURATION INTERFACE AND WIDGET COMPONENT OF AN ASSET MANAGEMENT SYSTEM

(71) Applicants: Atlassian PTY Ltd., Sydney (AU); Atlassian Inc., San Francisco, CA (US)

(72) Inventors: Nithaya Phoutchanthavongsa, Sydney (AU); Phillip Allard, Laval (CA); Jean-Christophe Huet, Montreal (CA)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/177,449

(22) Filed: Feb. 17, 2021

(65) Prior Publication Data
US 2022/0261139 A1 Aug. 18, 2022

(51) Int. Cl.
*G06F 3/04847* (2022.01)
*G06F 9/451* (2018.01)
*H04L 41/22* (2022.01)

(52) U.S. Cl.
CPC .......... *G06F 3/04847* (2013.01); *G06F 9/451* (2018.02); *H04L 41/22* (2013.01)

(58) Field of Classification Search
CPC ....... G06F 3/04847; G06F 9/451; H04L 41/22
See application file for complete search history.

(56) References Cited

U.S. PATENT DOCUMENTS

| | | | |
|---|---|---|---|
| 5,860,073 A | 1/1999 | Ferrel et al. | |
| 6,826,727 B1 | 11/2004 | Mohr et al. | |
| 8,091,036 B1 | 1/2012 | Pavek et al. | |
| 9,832,159 B1 * | 11/2017 | Kursun | H04L 51/52 |
| 2003/0058277 A1 | 3/2003 | Bowman-Amuah | |
| 2004/0015367 A1 | 1/2004 | Nicastro et al. | |
| 2006/0015818 A1 * | 1/2006 | Chaudhri | G06F 3/0482 |
| | | | 715/779 |
| 2006/0031882 A1 * | 2/2006 | Swix | H04N 21/25883 |
| | | | 348/E7.071 |
| 2006/0150092 A1 | 7/2006 | Atkins | |
| 2006/0200779 A1 | 9/2006 | Taylor | |
| 2007/0101279 A1 * | 5/2007 | Chaudhri | G06F 3/0481 |
| | | | 715/762 |

(Continued)

*Primary Examiner* — Daniel W Parcher
(74) *Attorney, Agent, or Firm* — Alston & Bird LLP

(57) ABSTRACT

Various embodiments are disclosed for managing a widget configuration interface in an asset management system. An apparatus is configured to receive a widget configuration request, cause rendering of a widget configuration interface to a visual display of a computing device, wherein the widget configuration interface comprises a widget title creation interface component, a widget configuration item selection interface, and an accessibility selection interface, receive a widget title creation request, one or more widget configuration item selection requests, and one or more accessibility selection requests in response to user interaction with the respective interface component and interfaces, generate a widget component interface template based at least in part on the received creation and selection requests, the widget component interface template comprising a widget title component, at least one widget content interface component, and at least one accessibility component; and cause storage of the widget component interface template.

23 Claims, 12 Drawing Sheets

(56) References Cited

U.S. PATENT DOCUMENTS

| | | | |
|---|---|---|---|
| 2007/0101288 A1* | 5/2007 | Forstall | G06F 3/04886 715/781 |
| 2007/0118813 A1* | 5/2007 | Forstall | G06F 3/0482 715/805 |
| 2007/0130541 A1* | 6/2007 | Louch | G06F 3/04817 715/804 |
| 2008/0034309 A1* | 2/2008 | Louch | G06F 3/0481 715/766 |
| 2008/0034314 A1* | 2/2008 | Louch | G06F 3/0481 715/778 |
| 2008/0055273 A1* | 3/2008 | Forstall | G06F 3/04883 345/173 |
| 2008/0133486 A1 | 6/2008 | Fitzgerald et al. | |
| 2008/0205742 A1 | 8/2008 | Lund | |
| 2008/0256439 A1 | 10/2008 | Boreham et al. | |
| 2008/0263514 A1* | 10/2008 | DeMesa | G06F 8/36 717/105 |
| 2008/0276182 A1 | 11/2008 | Leow | |
| 2009/0106656 A1 | 4/2009 | Handy et al. | |
| 2009/0113322 A1 | 4/2009 | Rogers | |
| 2010/0077325 A1 | 3/2010 | Barnea et al. | |
| 2011/0016423 A1 | 1/2011 | Brubaker | |
| 2011/0289439 A1 | 11/2011 | Jugel | |
| 2012/0084674 A1 | 4/2012 | Steven | |
| 2012/0102498 A1 | 4/2012 | Subramanya et al. | |
| 2014/0310582 A1 | 10/2014 | Bardman | |
| 2017/0102927 A1 | 4/2017 | Gunther et al. | |
| 2017/0277407 A1 | 9/2017 | Siravuri | |
| 2017/0371849 A1 | 12/2017 | Levi et al. | |
| 2019/0114063 A1 | 4/2019 | Geva et al. | |
| 2019/0121623 A1 | 4/2019 | Stephan | |
| 2019/0342185 A1* | 11/2019 | Barmentloo | G06F 16/26 |
| 2020/0372206 A1 | 11/2020 | Fialkow et al. | |
| 2021/0034225 A1 | 2/2021 | Harazi et al. | |

* cited by examiner

WIDGET CONFIGURATION INTERFACE AND WIDGET COMPONENT OF AN ASSET MANAGEMENT SYSTEM

BACKGROUND

Various asset management systems are available that allow an organization, enterprise, and its users to gain visibility into and manage assets, objects, and resources. Users may interact with the asset management system for a variety of purposes, including accessing information regarding such assets, objects, and resources. Such users have a myriad of roles, objectives, and responsibilities, and therefore, a variety of preferences, needs, and requirements of the asset management system. Applicant has identified a number of deficiencies and problems associated with accessing conventional asset management systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatuses, systems, and computer program products for facilitating widget component creation and configuration via intuitive widget configuration interfaces and widget components in an asset management system. In accordance with one exemplary embodiment, an apparatus is configured to manage a widget configuration interface of an asset management system, the apparatus comprising at least one processor and at least one memory, the at least one memory having computer-coded instructions therein. In some embodiments, the computer-coded instructions are configured to, in execution with the at least one processor, cause the apparatus to receive a widget configuration request comprising a first user identifier associated with a first user, cause rendering of a widget configuration interface to a visual display of a computing device in response to receiving the widget configuration request, wherein the widget configuration interface comprises a widget title creation interface component, a widget configuration item selection interface, and an accessibility selection interface, receive a widget title creation request in response to user interaction with the widget title creation interface component, receive one or more widget configuration item selection requests in response to user interaction with the widget configuration item selection interface, receive one or more accessibility selection requests in response to user interaction with the accessibility selection interface, generate a widget component interface template based at least in part on the received creation and selection requests, the widget component interface template comprising a widget title component, at least one widget content interface component, and at least one accessibility component; and cause storage of the generated widget component interface template in association with the first user identifier in an widget component interface template repository.

In some embodiments, the widget configuration item selection interface comprises one or more widget configuration items. In some further embodiments, at least one of the one or more widget configuration items comprises a widget configuration item suggestion, the widget configuration item suggestion determined based on user profile data, historical widget interaction data, or combinations thereof.

In some embodiments, the widget configuration item selection interface comprises at least one widget configuration item associated with a first pre-defined widget component and at least one widget configuration item associated with a second pre-defined widget component.

In some embodiments, the computer-coded instructions are further configured to cause the apparatus to receive a widget configuration item suggestion request, determine one or more widget configuration item suggestions, and cause rendering at least one of the one or more widget configuration item suggestions to the widget configuration item selection interface. In order to determine one or more widget configuration item suggestions, in some embodiments, the computer-coded instructions are configured to cause the apparatus to retrieve user profile data associated with the first user identifier from a user profile repository, wherein the user profile data comprises user role data, identify a plurality of widget configuration item suggestions based on the user role data, rank the plurality of widget configuration items suggestions, and select the one or more widget configuration item suggestions based on the ranking of the plurality of widget configuration item suggestions.

In some embodiments, the computer-coded instructions are further configured to cause the apparatus to receive a widget component display request comprising the first user identifier and an object identifier, retrieve the generated widget component interface template associated with the first user identifier from the widget content template repository, wherein the generated widget component interface template comprises a widget component interface template identifier, retrieve a subset of object data associated with the object identifier and the widget component interface template identifier from an object data repository, dynamically instantiate the generated widget component interface template with the retrieved subset of object data by programmatically mapping the subset of object data to one or more particular widget fields in the generated widget component interface template, and cause rendering of the dynamic instantiation of the generated widget component interface template to a widget component on the visual display of the computing device. In some further embodiments, the widget component is rendered to an interface in accordance with the at least one accessibility component. In some embodiments, the interface is a dashboard interface. In still further embodiments, the interface is an object page interface. In still further embodiments, the widget component is rendered to the computing device such that it is accessible external to the asset management system.

In some embodiments, the widget configuration interface further comprises an object type selection interface and wherein the computer-coded instructions are further configured to cause the apparatus to receive one or more object type selection requests in response to user interaction with the object type selection interface, each of the one or more object type selection requests corresponding to an object type identifier, and cause storage of the generated widget component interface template in association with the first user identifier and one or more object type identifiers in the widget component interface template repository.

In accordance with another exemplary embodiment, a method for managing a widget configuration interface of an asset management system comprises receiving a widget configuration request comprising a first user identifier associated with a first user, rendering a widget configuration interface to a visual display of a computing device in response to receiving the widget configuration request, wherein the widget configuration interface comprises a widget title creation interface component, a widget configuration item selection interface, and an accessibility selection interface, receiving a widget title creation request in response to user interaction with the widget title creation interface component, receiving one or more widget configuration item selection requests in response to user interaction with the widget configuration item selection interface, receiving one or more accessibility selection requests in response to user interaction with the accessibility selection interface, generating a widget component interface template based at least in part on the received creation and selection requests, the widget component interface template comprising a widget title component, at least one widget content interface component, and at least one accessibility component, and storing the generated widget component interface template in association with the first user identifier in an widget component interface template repository.

In some embodiments, the widget configuration item selection interface comprises one or more widget configuration items. In some further embodiments, at least one of the one or more widget configuration items comprises a widget configuration item suggestion, the widget configuration item suggestion determined based on user profile data, historical widget interaction data, or combinations thereof.

In some embodiments, the widget configuration item selection interface comprises at least one widget configuration item associated with a first pre-defined widget component and at least one widget configuration item associated with a second pre-defined widget component.

In some further embodiments, the method comprises receiving a widget configuration item suggestion request, determining one or more widget configuration item suggestions, and rendering at least one of the one or more widget configuration item suggestions to the widget configuration item selection interface. In order to determine one or more widget configuration item suggestions, in some embodiments, the method further comprises retrieving user profile data associated with the first user identifier from a user profile repository, wherein the user profile data comprises user role data, identifying a plurality of widget configuration item suggestions based on the user role data, ranking the plurality of widget configuration items suggestions, and selecting the one or more widget configuration item suggestions based on the ranking of the plurality of widget configuration item suggestions.

In some embodiments, the method further comprises receiving a widget component display request comprising the first user identifier and an object identifier, retrieving the generated widget component interface template associated with the first user identifier from the widget content template repository, wherein the generated widget component interface template comprises a widget component interface template identifier, retrieving a subset of object data associated with the object identifier and the widget component interface template identifier from an object data repository, dynamically instantiating the generated widget component interface template with the retrieved subset of object data by programmatically mapping the subset of object data to one or more particular widget fields in the generated widget component interface template, and rendering the dynamic instantiation of the generated widget component interface template to a widget component on the visual display of the computing device. In some further embodiments, the widget component is rendered to the interface in accordance with the at least one accessibility component. In still further embodiments, the widget component is rendered to a dashboard interface, an object page interface, and/or the computing device such that it is accessible external to the asset management system.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
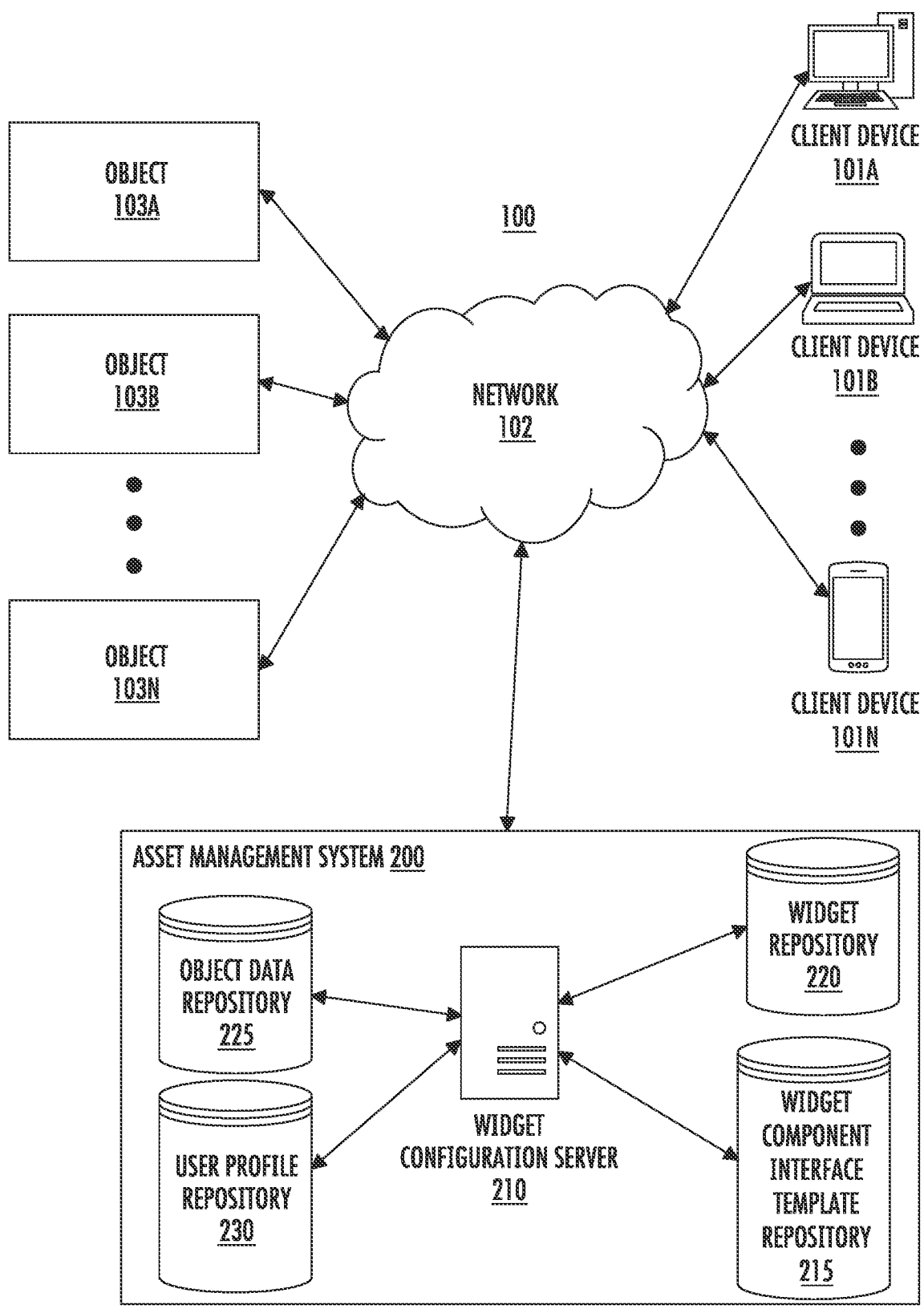
Figure 2:
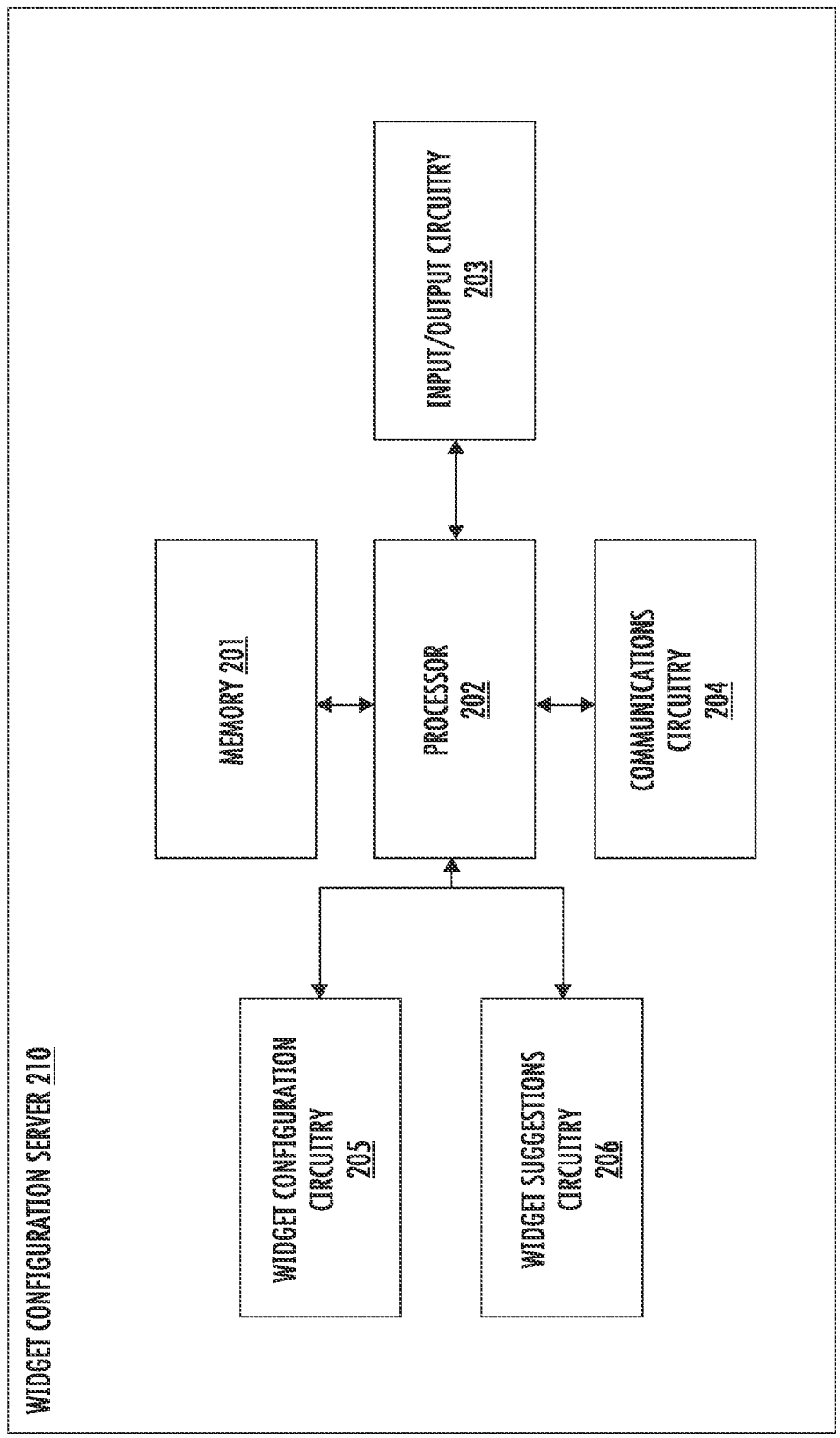
Figure 3:
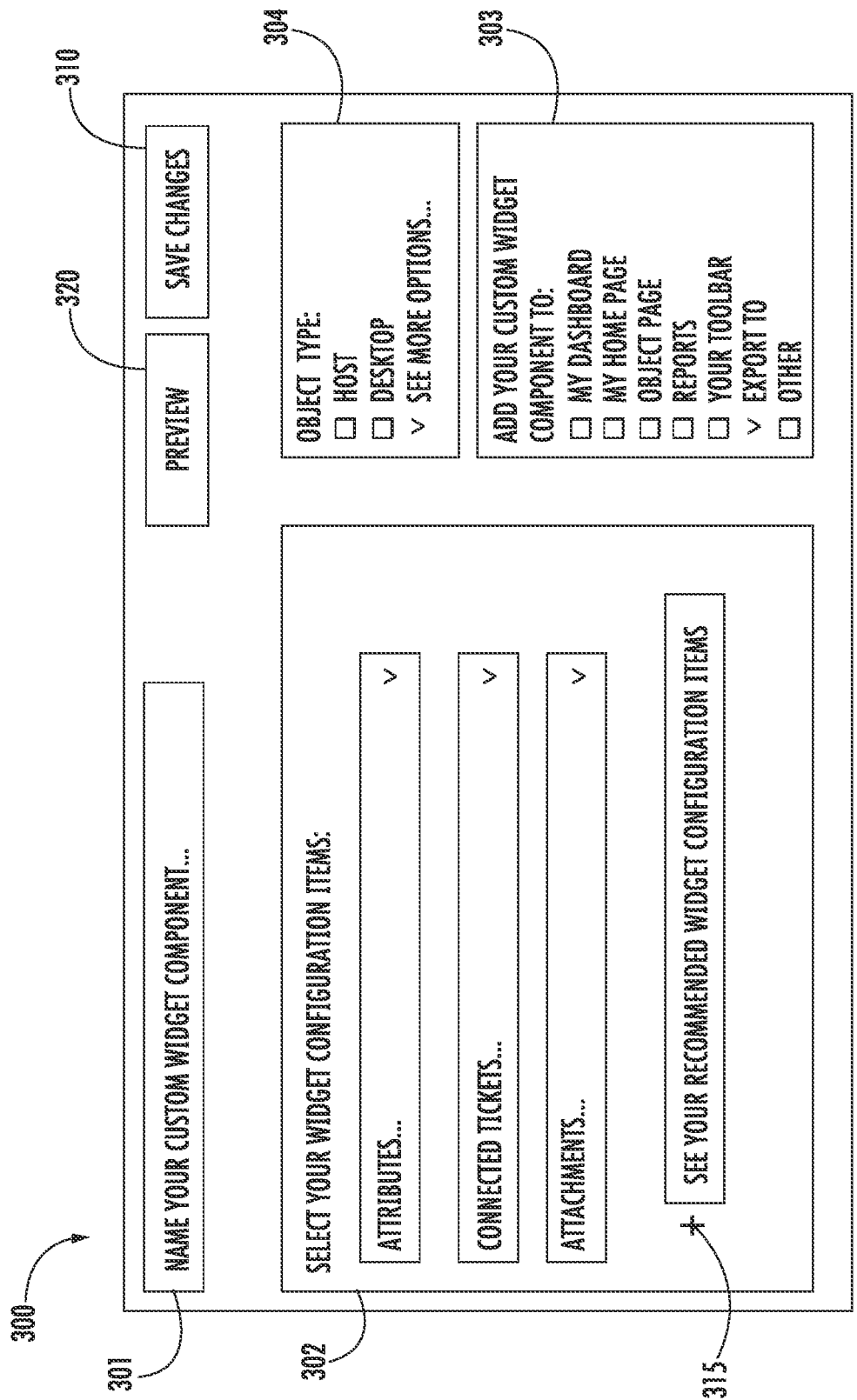
Figure 4:
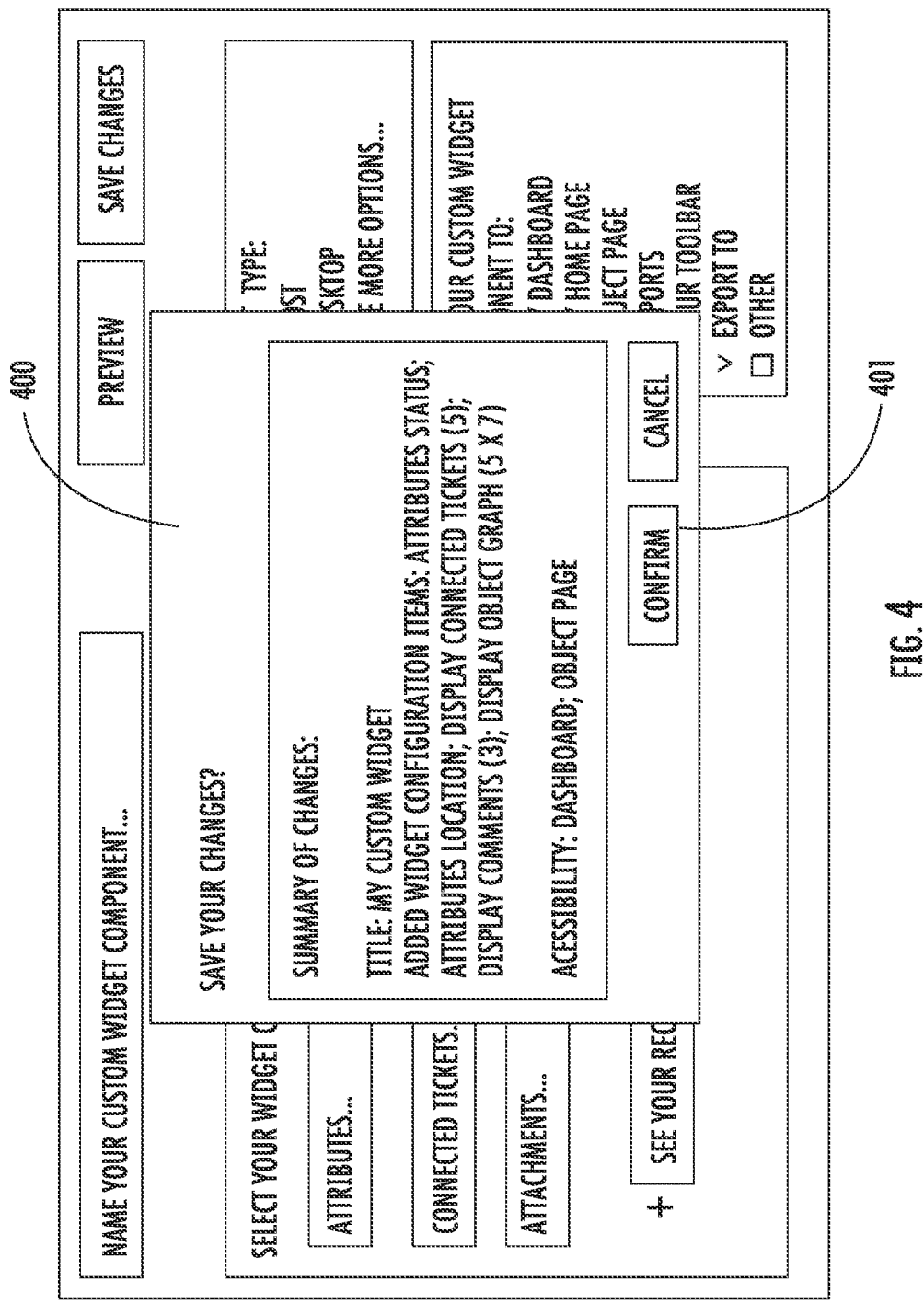
Figure 5A:
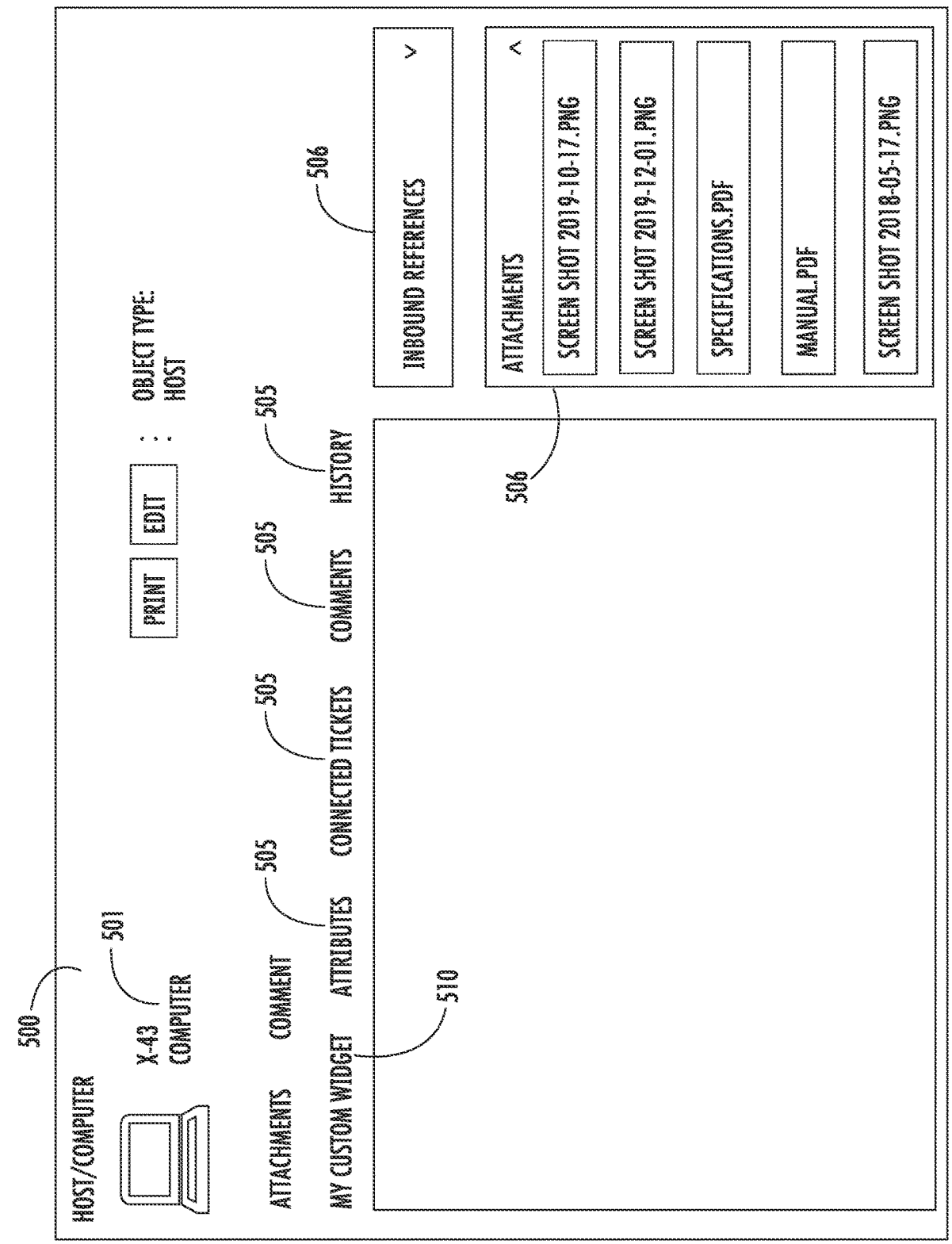
Figure 5B:
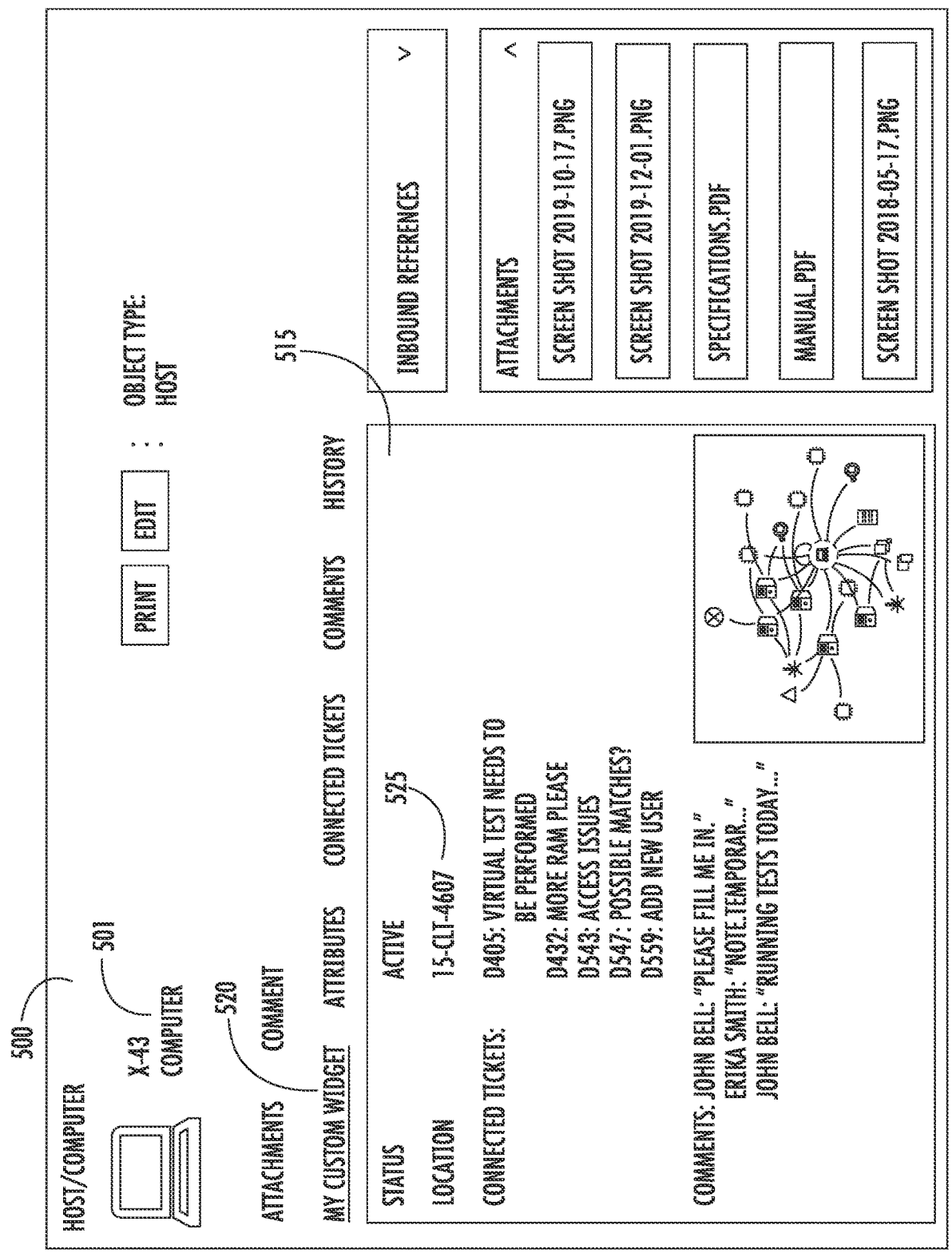
Figure 6A:
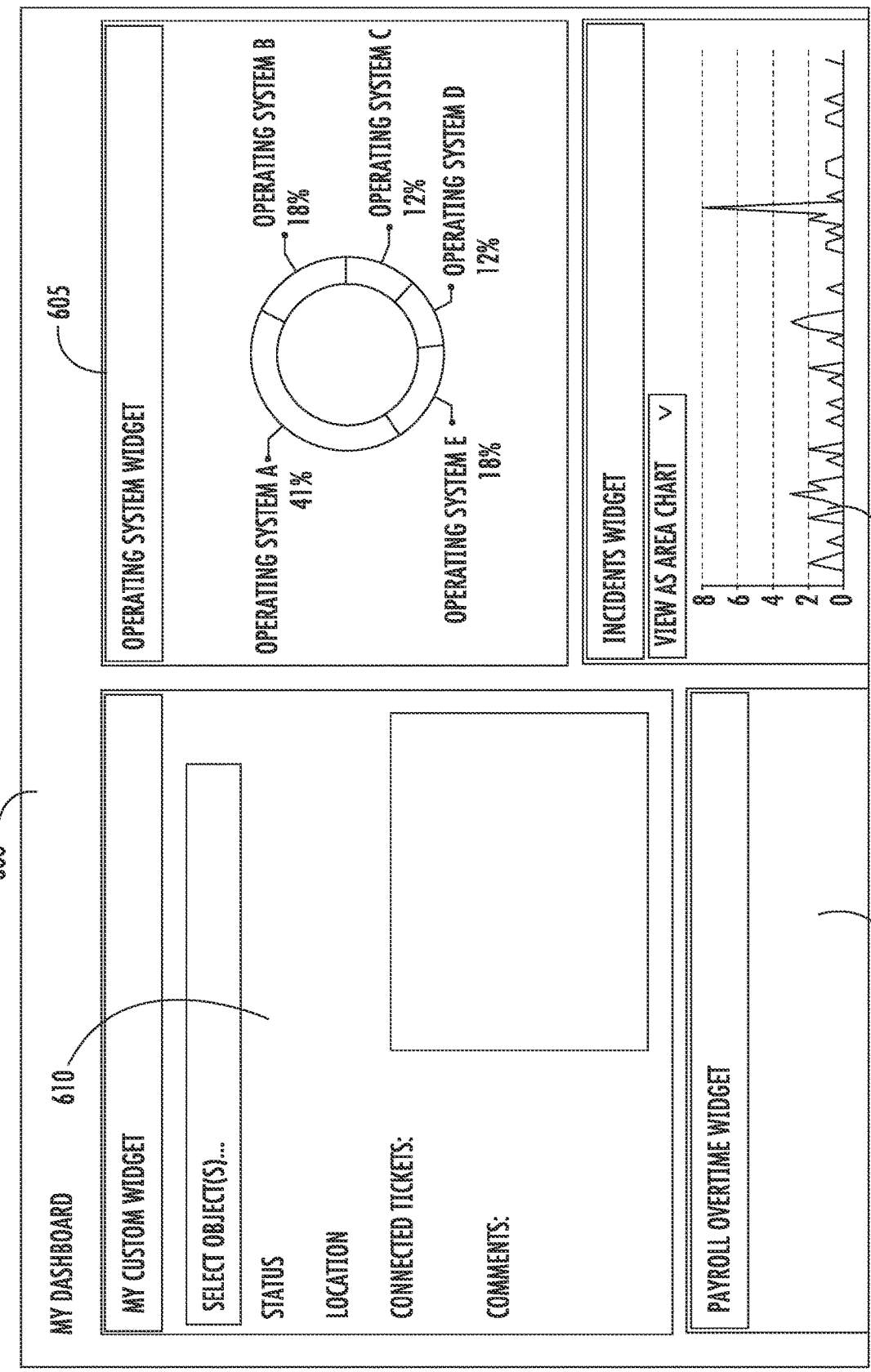
Figure 6B:
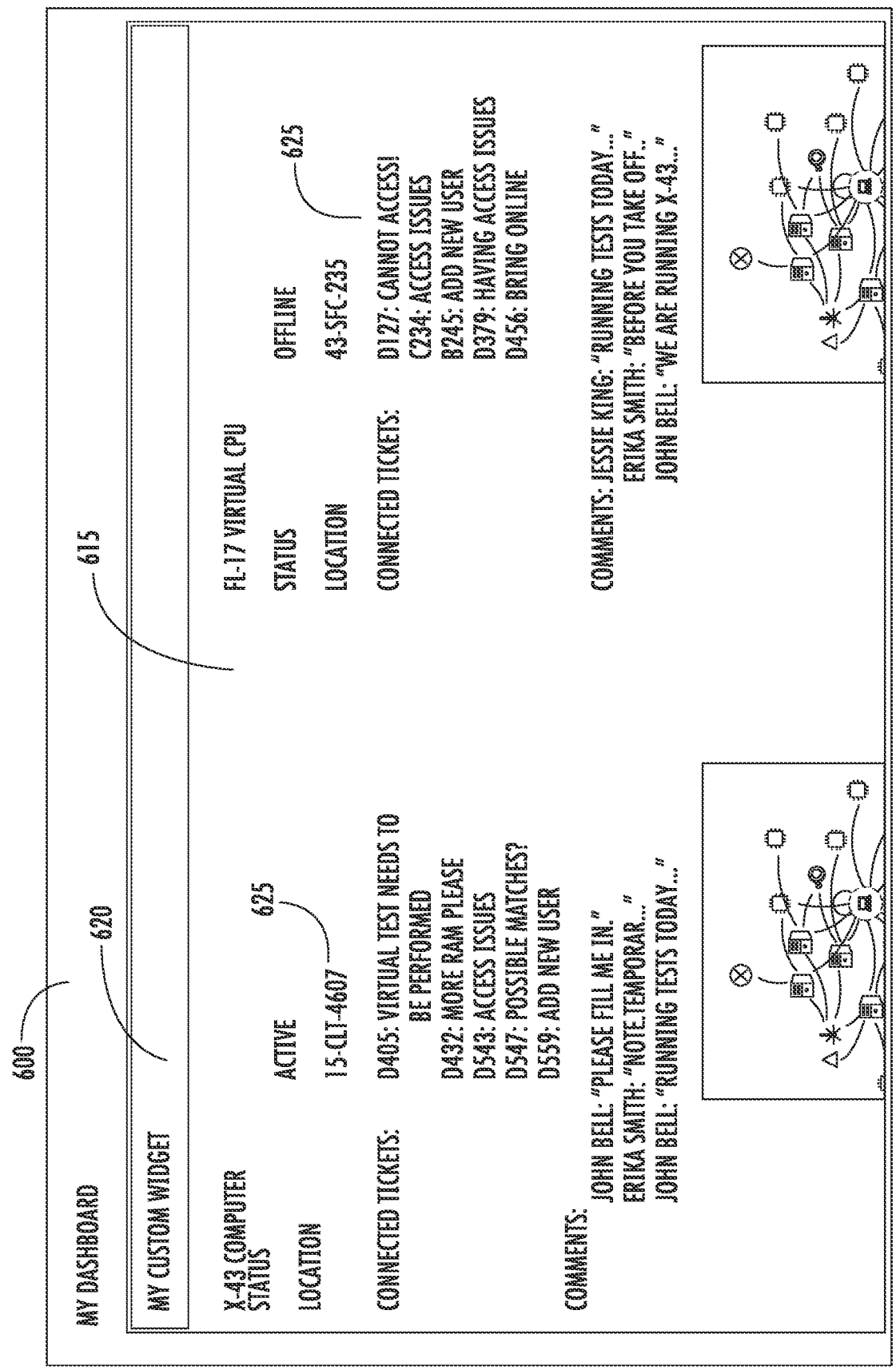
Figure 7A:
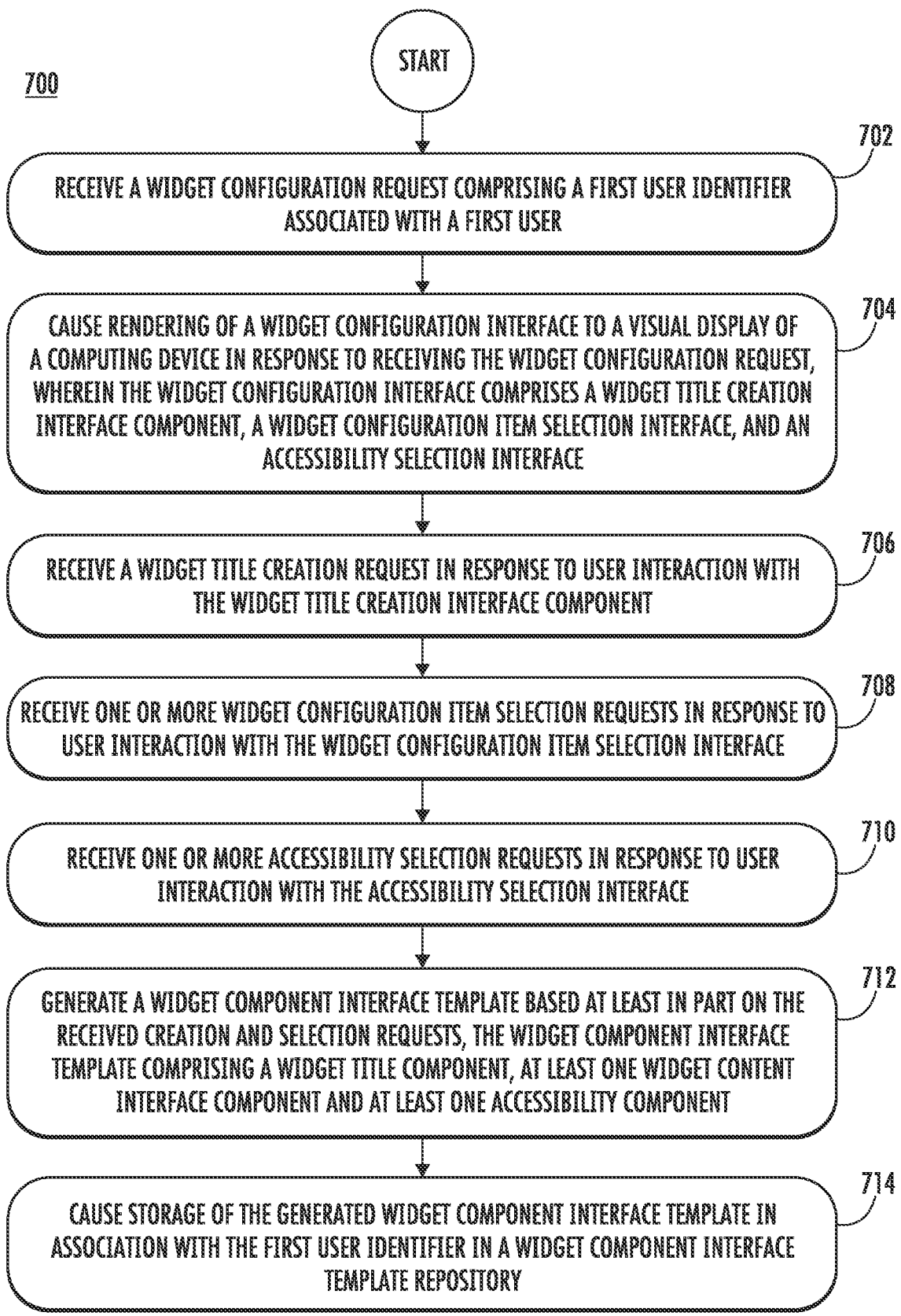
Figure 7B:
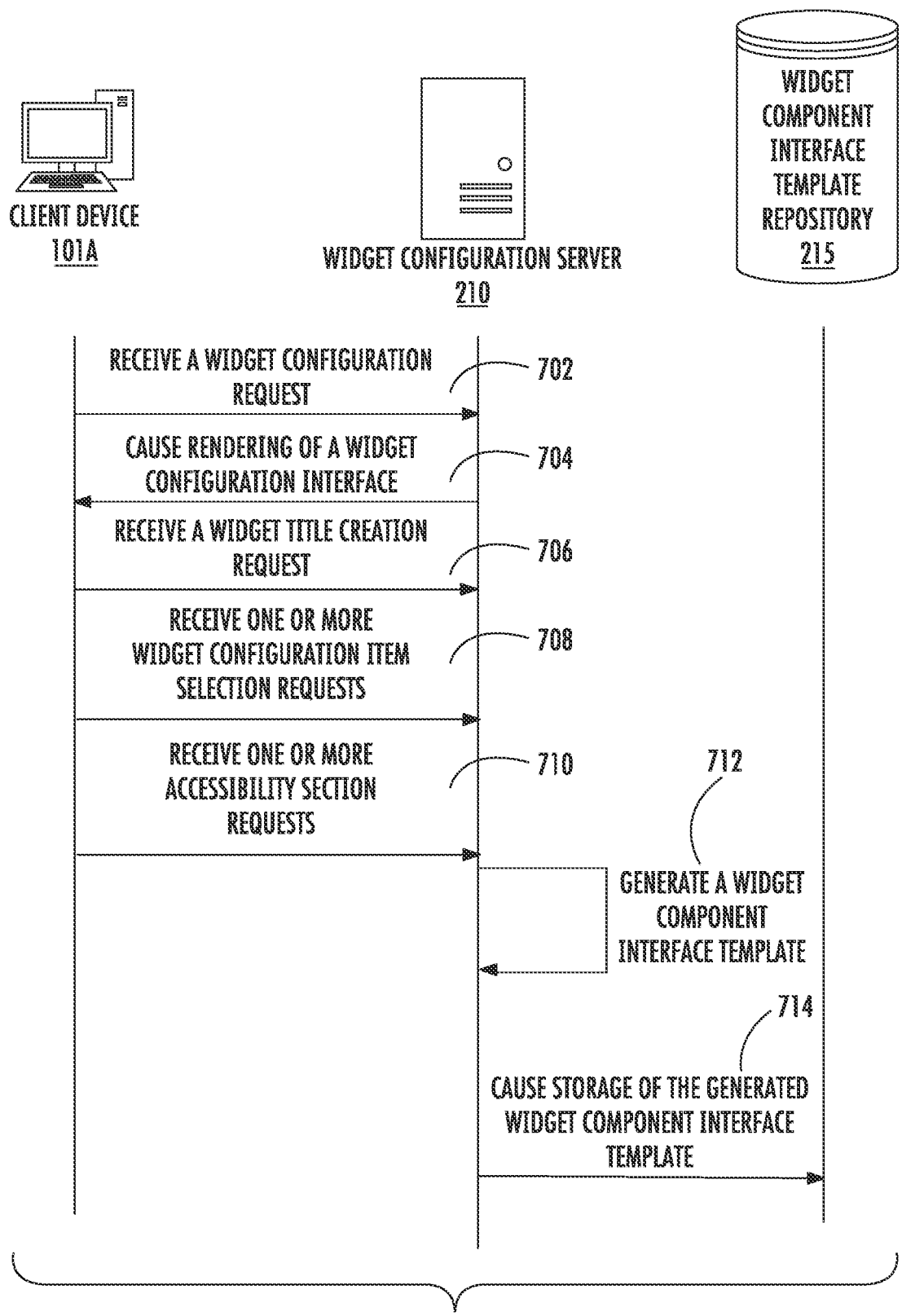
Figure 8A:
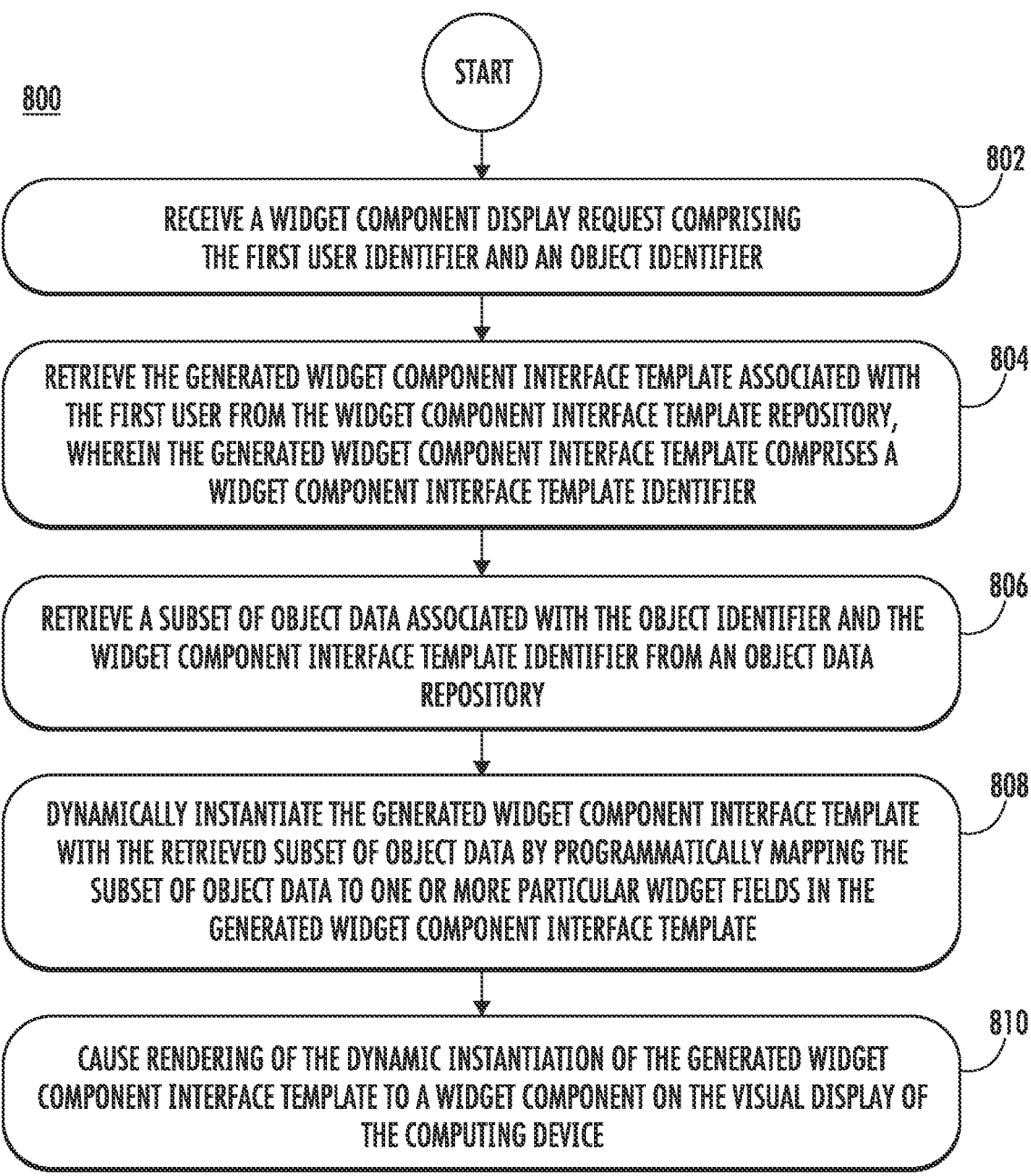
Figure 8B:
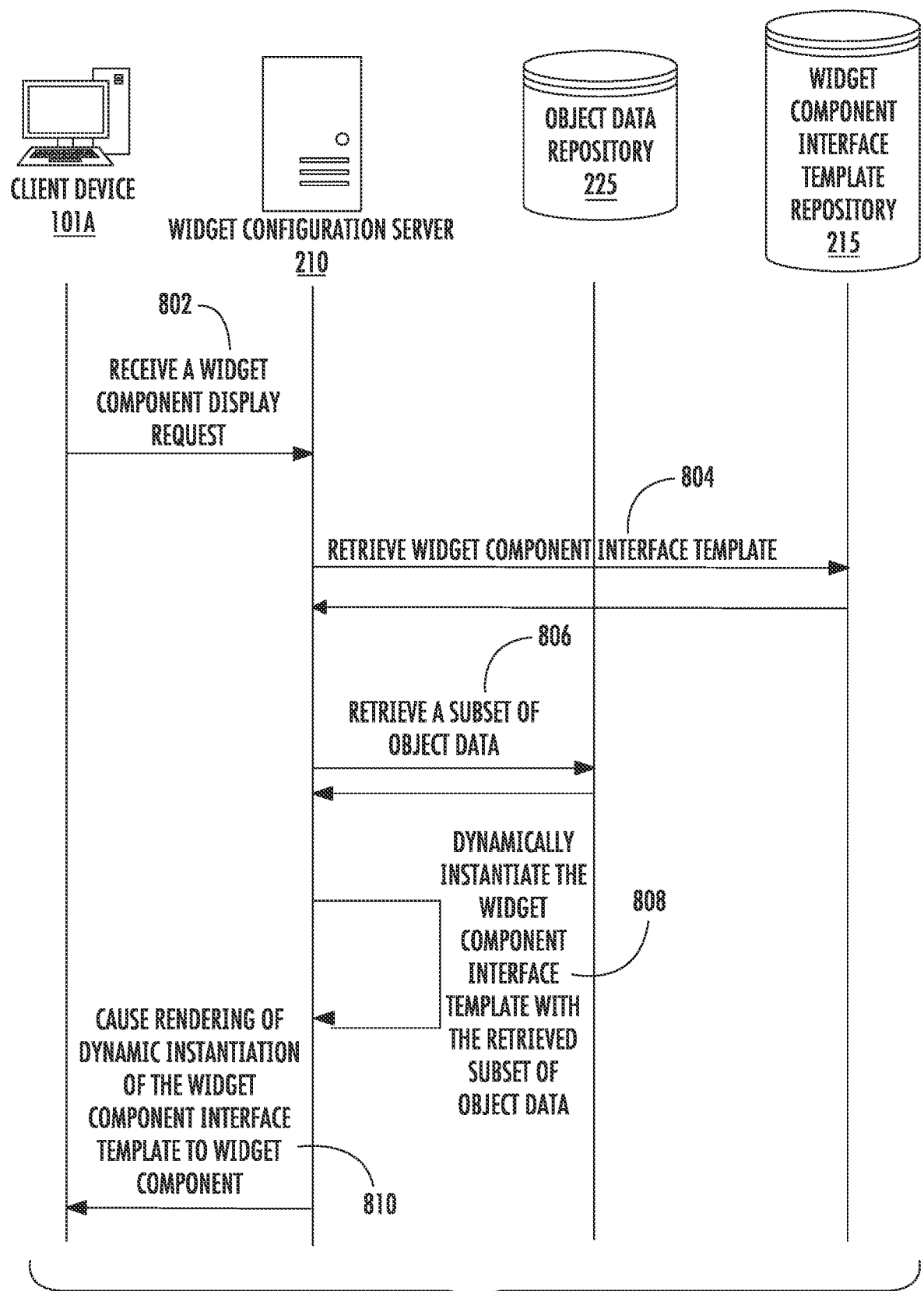

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates a system diagram including devices that may be involved in some example embodiments described herein;

FIG. 2 is a schematic block diagram of example circuitry that may perform various operations in accordance with various aspects and embodiments of the subject disclosure;

FIG. 3 illustrates an example widget configuration interface structured in accordance with example embodiments of the subject disclosure;

FIG. 4 illustrates an example change authorization confirmation interface structured in accordance with an example embodiment of the subject disclosure;

FIG. 5A illustrates an example widget component in a reduced format in an object interface structured in accordance with an example embodiment of the subject disclosure;

FIG. 5B illustrates an example widget component in an expanded format in an object interface structured in accordance with an example embodiment of the subject disclosure;

FIG. 6A illustrates an example widget component in a dashboard interface structured in accordance with an example embodiment of the subject disclosure;

FIG. 6B illustrates and example widget component in a dashboard interface structured in accordance with an example embodiment of the subject disclosure;

FIG. 7A is a flowchart illustrating example operations for managing a widget configuration interface in accordance with various aspects and embodiments of the subject disclosure;

FIG. 7B is a signal diagram of an example data flow in accordance with various aspects and embodiments of the subject disclosure;

FIG. 8A is a flowchart illustrating example operations for dynamically instantiating a widget component interface template to an interface in accordance with various aspects and embodiments of the subject disclosure; and FIG. 8B is a signal diagram of an example data flow in accordance with various aspects and embodiments of the subject disclosure.

DETAILED DESCRIPTION

One or more embodiments are now more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server as an example "apparatus." However, elements of the apparatus described herein may be equally applicable to the claimed method and computer program product. Accordingly, use of any such terms should not be taken to limit the spirit and scope of embodiments of the present disclosure.

Overview

A method, apparatus, system, and computer program product are provided in accordance with example embodiments of the present disclosure in order to provide improved widget configuration interfaces and generation of widget components in an asset management system. It is desirable to allow users to interact with and access data associated with the assets, objects, or references of an asset management system. However, a "one size fits all" type access is undesirable as such access may include a wide variety of data, not all of which is of interest to all users, such data being displayed in a static and/or basic template. Furthermore, data or information pertinent to some users may be time-sensitive, such that users may miss or overlook an important dynamic attribute or issue associated with an asset or object that may otherwise be crucial to the role of the user. Accordingly, it is undesirable for asset management systems to have static access configurations that lack flexibility for adjusting the content, layout, structure, and association of such access in response to user preferences, user relevance, the variety of specific data needs or interests associated with different roles within an organization or enterprise, and disparate levels of programming experience.

As a result of these problems and others that may arise from time to time, asset management systems may suffer due to the inability to account for such disparate requirements and be further plagued by many technical restrictions and limitations. For example, it is undesirable for a system to provide all the information associated with a selected asset or object, including superfluous data that may be irrelevant to the user, in response to a request for access to such data, thereby overburdening or depleting network resources and data processing requirements of the system. This problem is only exacerbated as the number of users and objects, assets, and resources increase for any particular asset management system. Such a configuration is not only inefficient and complicated, but also counter-intuitive to the underlying purpose of an asset management system.

Accordingly, to overcome these problems and others, various embodiments of the present disclosure relate generally to improved widget configuration interfaces and generating widget components in a manner that is more robust, efficient, intuitive, and dynamic, such improved widget configuration interfaces and widget components structured to provide a flexibility of configurability to users (e.g., an IT administrator, enterprise employee, HR representative) accessing an asset management system. Such improved widget configuration interfaces enable the customization and personalization of the layout, structure, access, and/or pertinent object data of the widget component at the level of the individual user, allowing different users to design any kind of desired widget component such that each user can access object data specifically or most pertinent to the particular user. Moreover, various embodiments of the present disclosure allow the user to add specific functionality, such as visualization of specifically pertinent object data, to an easily accessible widget component in order to address individual needs of the asset management system. The widget configuration interfaces and the widget components of the present disclosure may be used as part of a standalone service, application, or device or they may be applied as a layer atop an existing service, application, or device (e.g., an existing asset management system).

As will be discussed in greater detail below, the widget configuration interface comprises a widget title creation interface component, a widget configuration item selection interface, and an accessibility selection interface. In some embodiments, the widget configuration server is configured to suggest one or more widget configuration items in association with the widget configuration item selection interface. The widget configuration server is configured to store and/or access a variety of data associated with the user, the objects, user interactions with the asset management system, and the like, such data providing a robust and dynamic supply to inform its determination of suggested widget configuration items. A widget component interface template, comprising a widget title component, at least one widget content interface component, and at least one accessibility component, is generated and stored in association with a user identifier based at least in part on at least one received widget title creation request, one or more widget configuration item selection requests, and one or more accessibility selection requests in response to user interaction with the widget title creation interface component, the widget configuration item selection interface and the accessibility selection interface of the widget configuration interface, respectively. Each widget component interface template is separate and distinct from other widget component interface templates. In response to a widget component display request comprising at least the user identifier, a widget component is arranged, compiled, and dynamically instantiated in accordance with the widget component interface template. In exemplary and non-limiting embodiments, the generated widget component(s) can be associated with any number of interfaces of the asset management system, enabling access to such specifically pertinent object data from a variety of access points without having to navigate numerous system interfaces.

From the user experience perspective, widget configuration interfaces structured in accordance with various embodiments of the present disclosure enable each user to maintain its own preferences that apply to its respective widget component interface templates, thereby greatly enhancing organizational productivity and efficiency by providing a customizable, convenient, and appropriate level of visibility of specifically pertinent data in an associated widget component. For example, a widget configuration interface and widget component structured in accordance with various embodiments of the present disclosure enable users to spend less time navigating through a series of system interfaces to locate the selected widget component and reviewing an overwhelming mixture of relevant and irrelevant information associated with an object. Instead, a user may quickly and conveniently access and review object data specifically pertinent to, for example, the user's preferences and/or roles within the organization from a widget component detached from any specific object page interface, such object data organized in a selection of widget title component and widget content interface component(s). The user-defined associations between selected widget configuration items and a particular widget component enable visualization of object data specifically pertinent to the user in an efficient manner without having to access several different conventional widget components in order to view such object data.

Applicant has identified that methods, apparatuses, systems, and computer program products structured in accordance with various embodiments of the present disclosure provide reduced network traffic and data processing by only transmitting a subset of object data (e.g., associated with an widget component interface template) rather than the entirety of the object data associated with a selected object. The user also experiences lower latency due to such optimized object data retrieval. Such reduced network traffic and data processing further amounts to less strain on the asset management system itself, leading to increased lifetime and efficiency of the asset management system. Moreover, by permitting object data (or a limited set of object data) to be organized and relocated for display in a widget component via selection of widget content interface component(s) that may be accessed from a variety of selected system interfaces, the system's ability to display information and interact with the user is improved. As such, systems structured in accordance with various embodiments of the present disclosure provide specific, technical solutions to technical problems faced by existing systems, the details of which are described hereafter.

These characteristics as well as additional features, functions, and details are described below. Similarly, corresponding and additional embodiments are also described below. The various implementations of the widget configuration interface and widget component of the present disclosure is not limited to displaying object data associated with a selected object in an asset management system and can instead be configured to display a wide variety of data characteristics for any set of data that might be of interest to a user. The widget configuration interface may be used to visualize any set of object, asset, or resource data for any purpose and it may be used in connection with numerous exemplary system architectures as explained in further detail herein. One of ordinary skill in the art will appreciate that the widget configuration interface related concepts discussed herein may be applied to better visualize characteristics of interest for a wide variety of object and/or data sets.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

As used herein, the term "user identifier" refers to one or more items of data by which a user may be identified within an asset management system. For example, a user identifier may comprise ASCII text, a pointer, an IP address, a MAC address, a memory address, or other unique identifier.

The term "widget configuration server" refers to a software platform and associated hardware that is configured to manage the various widget configuration interfaces and widget components of the asset management system. The widget configuration server is accessible via one or more computing devices, is configured to receive configuration requests, and access one or more data repositories such as a widget repository or a widget component interface template repository. The functionality of the widget configuration server may be provided via a single server or collection of servers having a common functionality, or the functionality of the widget configuration server may be segmented among a plurality of servers or collections of servers performing subsets of the described functionality of the widget configuration server.

The term "widget configuration request" refers to an electrically generated digital object created by a computing device that indicates that a user has provided an input comprising a request to configure a widget component interface template via a widget configuration interface. A widget configuration request may be represented via a temporary code that notifies a recipient (e.g., a server) that a user has made the request. To provide further context, a widget configuration request is generated in response to a user interaction with a computing device wherein a user causes the computing device to generate a widget configuration request by interacting with, for example, a specific widget configuration actuator button rendered on a visual display of the computing device.

The term "widget configuration interface" refers to a user interface element that is rendered to a visual display and is configured (e.g., provides options) to enable a user to customize the layout, structure, access, and/or object information to be visually represented in an widget component in an asset management system. Exemplary widget configurations interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the widget configuration interface 300 of FIG. 3 is an example of a widget configuration interface.

The term "widget title creation interface component" refers to a user interface element that is rendered as a configurable portion of a widget configuration interface and is configured for, among other things, user entry of a user-defined widget title text component. For example, the widget title creation interface component 301 of FIG. 3 is an example of a widget title creation interface component.

The term "widget configuration item selection interface" refers to a user interface element that is rendered as a portion of a widget configuration interface and is configured to enable a user to view and interact with the interface in order to select one or more widget configuration items to be customized and/or rendered in association with a selected widget component in an object page template and/or an object page interface. For example, the widget configuration item selection interface 302 of FIG. 3 is an example of a widget configuration item selection interface.

The term "accessibility selection interface" refers to a user interface element that is rendered as a portion of a widget configuration interface and is configured to allow a user to specify the accessibility of the widget component to be generated. In some embodiments, the accessibility selection interface is configured to enable the user to associate the widget component to be generated with one or more interfaces associated with the asset management system. In some embodiments, the accessibility selection interface is configured to enable the user to associate the widget component to be generated to an interface external to the asset management system. The accessibility selection interface 303 of FIG. 3 is an example of a accessibility selection interface.

The term "object type selection interface" refers to a user interface element that is rendered as a portion of a widget configuration interface and is configured to enable a user to view and interact with the interface in order to select one or more object types to be associated with a widget component interface template. For example, the object type selection interfaces 304 of FIG. 3 is an example of an object type selection interface.

The term "preview executable interface element" refers to a user interface element that is rendered as a portion of a widget configuration interface that is configured to enable a user to view a preview interface component. The "preview interface component" is a user interface element that is rendered to a widget configuration interface and is configured to provide a widget configuration preview to the user, enabling the user to preview pending additions and/or changes to the template before additions and/or changes are actually initiated, made, and/or saved to the template. The preview executable interface element may be depicted by a representative button or other executable interface element that the user may click, select, or otherwise interact with to indicate selection of the preview executable interface element.

The term "widget configuration item selection request" refers to an electrically generated digital object created by a computing device upon user engagement with a widget configuration item selection interface that indicates that a user has provided an input comprising a request to add and/or configure a selected widget configuration item to be rendered as a widget content interface component in a widget component interface template and/or widget component. A widget configuration item selection request may be represented via a temporary code that notifies a recipient (e.g., a server) that a user has made the request. To provide further context, a widget configuration item selection request is generated in response to a user interaction with a computing device, for example, with a widget configuration item selection interface rendered as a portion of a widget configuration interface, wherein a user causes the computing device to generate a widget configuration item selection request by interacting with, for example, an indication of a selection of a widget configuration item from a dropdown menu or an actuator button associated with a widget configuration item, the actuator button rendered on a visual display of the computing device. In some embodiments, the widget configuration item selection request comprises a widget configuration item identifier associated with the corresponding widget configuration item.

The term "object type selection request" refers to an electrically generated digital object that indicates that a user has provided an input comprising a request to select one or more object types to be associated with a widget component interface template. An object type selection request may be represented via a temporary code that notifies a recipient (e.g., a server) that a user has made the request. To provide further context, an object type selection request is generated in response to a user interaction with a computing device wherein a user causes the computing device to generate an object type selection request by interacting with, for example, an indication of a selection of one or more object types from a dropdown menu or actuator button(s) associated with such object type(s), the actuator button(s) rendered on a visual display of the computing device.

The term "preview interface request" refers to an electrically generated digital object that indicates that a user has provided an input comprising a request to preview pending additions and/or changes to the template before additions and/or changes are actually initiated, made, and/or saved to the template. A preview interface request may be represented via a temporary code that notifies a recipient (e.g., a server or the client device) that a user has made the request. To provide further context, in some embodiments, a preview interface request is generated in response to a user interaction with a computing device wherein a user causes the computing device to generate a preview interface request by interacting with, for example, a preview executable interface element that is rendered as a portion of a widget configuration.

The term "widget component interface template" should be understood to refer to the format, layout, organization, structure, arrangement, and/or display of content and/or information (e.g., widget component items, object data, and the like) used to render a widget component in an asset management system. As such, the widget component interface template defines the accessibility of the associated widget component and the selected object data, including the structure and/or organization of such selected object data, to be displayed in response to receipt of a widget component display request. For example, in some embodiments, the widget component interface template comprises a widget title component, at least one widget content interface component, and at least one accessibility component.

The term "widget title component" should be understood to refer to the arrangement, structure, and/or layout of the widget title of the widget component in a widget component interface template, such that the widget title component is rendered in a specific format pursuant to a dynamic instantiation of the widget component interface template to a widget component in an asset management system.

The term "widget content interface component" should be understood to refer to the arrangement, structure, and/or layout of a corresponding widget configuration item in a widget component interface template, such that the widget content interface component is rendered in a specific format and/or arrangement pursuant to a dynamic instantiation of the widget component interface template to a widget component in an asset management system.

The term "accessibility component" should be understood to refer to the accessibility of a widget component based at least in part on one or more accessibility selection requests associated with the creation and/or revision of a widget component interface template via a widget configuration interface pursuant to a dynamic instantiation of the widget component interface template to a widget component in an asset management system. For example, the widget component is generated and/or associated with one or more interfaces of the asset management system such that the widget component is accessible to the user.

In some embodiments, the apparatus dynamically instantiates the widget component interface template with object data to render a widget component. For example, in certain embodiments, the widget component interface template comprises widget fields and the apparatus programmatically maps object data or a subset of object data to one or more particular widget fields in the widget component interface template to render the widget component. In some embodiments, the widget component interface template is associated with a user identifier such that the widget component interface template is user-specific. For example, in some embodiments, the specific configuration of a widget content interface component in a widget component interface template associated with a first user identifier differs from the configuration in widget component interface template associated with a second user identifier. In certain embodiments, the widget component interface template is associated with one or more object type identifiers such that the widget component interface template is object type-specific. In still further embodiments, the widget component interface template is associated with at least one user identifier and one or more object type identifiers. In still further embodiments, the widget component interface template is associated with one or more object identifiers.

The term "widget component interface template repository" refers to a structured data set or computing location, such as a memory device, where data is stored, accessed, modified and otherwise maintained by the widget configuration server. The stored data includes information that facilitates the operation of the asset management system. The widget component interface template repository may be embodied as a data storage device or devices, as a separate database server or servers, or as a combination of data storage devices and separate database servers. The widget component interface template repository may be a dedicated device and/or a part of a larger repository. In some embodiments, the widget component interface template repository stores data that is generated based on user input, user selections, and user interaction with the asset management system in association with the widget configuration interface and its related interface elements, such as widget component interface templates, widget component template identifier(s) and user identifier(s). Such data can be queried and retrieved by the widget configuration server.

The term "widget component" is an interface component rendered to any asset management system interface, the component visually organizing a display of object data and/or a subset of object data associated with one or more selected objects in an asset management system. For example, a widget component includes, but is not limited to, a widget title component and at least one widget content interface component. The accessibility of a widget component (e.g., widget component is generated and/or associated with one or more interfaces of the asset management system such that the widget component is accessible to the user) is determined based at least in part on one or more accessibility selection requests associated with the creation and/or revision of a widget component interface template via a widget configuration interface. In some embodiments, a widget component is capable of being rendered to an interface in two or more states or formats. For example, in some embodiments, a widget component is a selectable element rendered in a first contracted or reduced format which is expandable to a second expanded format in response to user interaction with the selectable first contracted or reduced format. For example, in certain embodiments, the first contracted or reduced format is a selectable element containing a title of the widget component, the widget component expanding to an expanded format in response to user interaction with the widget component, the expanded format allowing for additional information including but not limited to, one or more widget configuration items (e.g., widget content interface components), to be displayed to the user. In addition, in association with an object page interface of an asset management system, in some embodiments, a widget component is a "horizontal widget component" such that it is rendered in a horizontal position in relation to other horizontal widget components. For example, a horizontal widget component may be rendered in a reduced format (e.g., tab), and or in an expanded format (e.g., panel). In certain embodiments, a widget component is associated with a horizontal orientation identifier in association with an object page interface. Similarly, in some embodiments, a widget component is a "vertical widget component" such that it is rendered in a vertical position in relation to other vertical widget components. For example, a vertical widget component may be rendered in a reduced format (e.g., a tab or the like), or in an expanded format (e.g., a panel or the like). In certain embodiments, a widget component is associated with a vertical orientation identifier in association with an object page interface. In certain embodiments, an object page interface comprises one or more horizontal widget components and one or more vertical horizontal widget components. The widget components 510, 515, 610, 615 of FIGS. 5A, 5B, 6A, and 6B are examples of a widget component structured in accordance with embodiments of the present disclosure.

The term "widget component template identifier" refers to one or more items of data by which a widget component interface template may be uniquely identified by an asset management system.

The term "widget component identifier" refers to one or more items of data by which a widget component and/or widget content interface component may be uniquely identified by an asset management system.

The term "orientation identifier" refers to one or more items of data by which the orientation of a widget component and/or widget content interface component is associated to be rendered to an interface of the asset management system (e.g., an object page interface). An orientation identifier is capable of being transmitted, received, and/or stored.

In some embodiments, orientation identifiers comprise a horizontal orientation identifier and a vertical orientation identifier.

The terms "widget configuration item" and "widget configuration items" refer to configurable settings and/or attributes associated with a widget configuration interface and widget component. In some embodiments, a user selects one or more widget configuration items to be displayed in association with a widget component, allowing the user to customize the object data to be rendered in association with a selected widget component in a selected interface of an asset management system. In this regard, the widget configuration items associated with a widget component in a widget component interface template may represent a subset or modified version of the available widget configuration items to widget components. In some embodiments, a widget configuration items is associated with a widget configuration item identifier. In still further embodiments, one or more widget configuration items are associated with a pre-defined widget component identifier.

The term "widget configuration interface object" refers to an object capable of being rendered in association with a widget configuration item to a widget configuration interface (e.g., widget configuration item selection interface). For example, a widget configuration interface object may comprise a widget configuration item name and/or description of the functionality or purpose of the associated widget configuration item. In some embodiments, a widget configuration interface object is configured for user engagement such that selection of a widget configuration interface object by a user triggers the creation of a widget configuration item selection request.

The term "widget component display request" refers to an electrically generated digital object that indicates that a user has provided an input comprising a request to display and/or expand a widget component. A widget component display request may be represented via a temporary code that notifies a recipient that a user has made the request. To provide further context, a widget component display request is generated in response to a user interaction with a computing device wherein a user causes the computing device to generate a widget component display request by interacting with, for example, an icon associated with an object or a specific widget component actuator button rendered on a visual display of the computing device.

The term "object page interface" refers to a user interface element that is rendered to a visual display of a computing device in an asset management system and is configured to display object data associated with a selected object. An object page interface may comprise one or more widget components.

The term "object" refers to a digital representation of an enterprise asset, object or resource that may be of various object types, such as a physical asset (e.g., computer, office furniture, vehicle, real estate, etc.), a digital asset (e.g., software), a piece of data, a person (e.g., new employee), or any other tangible or intangible asset (e.g., intellectual property) that may be registered, known, or accessed by the asset management system. For example, an object may be a laptop or other IT-related item wherein object data, such as attributes, ticket information, comments, and the like, for the object is uploaded or otherwise stored in a data repository (e.g., an object data repository) accessible by the asset management system. In various embodiments, an object may refer to employees or users that are identifiable.

The term "object data" refers to a collection of data associated with and/or related to an object in an asset management system that is capable of being transmitted, received, and/or stored. In some embodiments, object data comprises an object identifier, attribute data, attachment data, object type data, ticket data, comment data, history data, inbound reference data, outbound reference data, and any other data that may serve to distinguish one or more objects from each other. In some embodiments, object data is generated by various components within the asset management system and/or by user input to the asset management system.

The term "object identifier" refers to one or more items of data by which an object of an asset management system may be uniquely identified. For example, an object identifier may comprise ASCII text, a pointer, a memory address, and the like.

The term "object data repository" refers to a structured data set or repository for storing one or more object data accessible by the widget configuration server. The object data repository may be a dedicated device and/or a part of a larger repository.

The term "object type" refers to a group, category, and/or classification of one or more objects. In some embodiments, two or more objects of an object type may have similar kinds of information. Exemplary object types include but are not limited to file system, network type (e.g., LAN, WAN, VPN), hardware type (e.g., host type or device type, client device type, computer, desktop, laptop, server type, mobile device, printer, modem), software type (e.g., application, operating system), accessory type, cloud, employee type, location, intellectual property (e.g., copyright, license type), etc.

The term "object type identifier" refers to one or more items of data by which an object type may be uniquely identified in an asset management system.

The term "version identifier" refers to one or more items of data by which a specific version of a widget component interface template may be identified within an asset management system. For example, a version identifier may comprise ASCII text, a pointer, a memory address, or other unique identifier. Version identifiers are used to distinguish different versions of widget component interface templates assigned the same widget component interface template identifier. The version identifier for a widget component interface template may be an increasing numeric number, wherein the version identifier increases with each update of the widget component interface template. However, it should be understood that other configurations are possible (e.g., alphanumeric values, hashes, and/or the like). In some embodiments, the version identifier is generated and assigned by the apparatus. In other embodiments, the version identifier is generated and assigned by a client device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level.

Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatuses, systems, and computer program products of the present disclosure may be embodied by any of a variety of computing devices. For example, the method, apparatus, system, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access an asset management system 200 via a communications network 102 using client devices 101A-101N. The asset management system 200 may comprise a widget configuration server 210 in communication with at least one repository, such as widget component interface template repository 215, widget repository 220, object data repository 225, and/or user profile repository 230. Such repository(ies) may be hosted by the widget configuration server 210 or otherwise hosted by devices in communication with the widget configuration server 210. Users may further access features or services of one or more objects 103A-103N through the asset management system 200.

The widget configuration server 210 may include circuitry, networked processors, or the like configured to perform some or all of the apparatus-based processes described herein, and may be any suitable network server and/or other type of processing device. In some embodiments, the widget configuration server 210 may determine and transmit commands and instructions for rendering one or more widget configuration interfaces and/or widget components to client devices 101A-101N, using data from, for example, widget component interface template repository 215, widget repository 220, object data repository 225, and/or user profile repository 230. In this regard, the widget configuration server 210 may be embodied by any of a variety of devices, for example, the widget configuration server 210 may be embodied as a computer or a plurality of computers. For example, the widget configuration server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments herein may have various form factors and designs but will nevertheless include at least the components illustrated in FIG. 2 and described in connection therewith. In some embodiments, the widget configuration server 210 may be located remotely from the widget component interface template repository 215, the widget repository 220, object data repository 225, and/or user profile repository 230, although in other embodiments, the widget configuration server 210 may comprise the widget component interface template repository 215, the widget repository 220, object data repository 225, and/or user profile repository 230. The widget configuration server 210 may, in some embodiments, comprise several servers or computing devices performing interconnected and/or distributed functions. Despite the many arrangements contemplated herein, the widget configuration server 210 is shown and described herein as a single computing device to avoid unnecessarily overcomplicating the disclosure.

The widget configuration server 210 can communicate with one or more client devices 101A-101N and/or one or more objects 103A-103N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the asset management system 200.

The widget component interface template repository 215 may be stored by any suitable storage device configured to store some or all of the information described herein (e.g., memory 201 of the widget configuration server 210 or a separate memory system separate from the widget configuration server 210, such as one or more database systems, backend data servers, network databases, cloud storage devices, or the like provided by another device (e.g., online application or 3rd party provider) or an object 103A-103N), such as a Network Attached Storage (NAS) device or devices, or as a separate database server or servers. The widget component interface template repository 215 may comprise data received from the widget configuration server 210 (e.g., via a memory 201 and/or processor(s) 202) and/or an object 103A-103N, and the corresponding storage device may thus store this data. The widget component interface template repository 215 includes information accessed and stored by the widget configuration server 210 to facilitate the operations of the asset management system 200. For example, the widget component interface template repository 215 may include, without limitation, user identifiers, object type identifiers, widget component interface templates, widget component interface template identifiers, widget fields, and the like.

The widget repository 220 may be stored by any suitable storage device configured to store some or all of the information described herein (e.g., memory 201 of the widget configuration server 210 or a separate memory system separate from the widget configuration server 210, such as one or more database systems, backend data servers, network databases, cloud storage devices, or the like provided by another device (e.g., online application or 3rd party provider) or an object 103A-103N, such as a Network Attached Storage (NAS) device or devices, or as a separate database server or servers. The widget repository 220 may comprise data received from the widget configuration server 210 (e.g., via a memory 201 and/or processor(s) 202) and/or an object 103A-103N, and the corresponding storage device may thus store this data. The widget repository 220 includes information accessed and stored by the widget configuration server 210 to facilitate the operations of the asset management system 200. For example, the widget repository 220 may include, without limitation, widget configuration items, widget component identifier, widget configuration interface objects, object type identifiers, and the like.

The object data repository 225 may be stored by any suitable storage device configured to store some or all of the information described herein (e.g., memory 201 of the widget configuration server 210 or a separate memory system separate from the widget configuration server 210, such as one or more database systems, backend data servers, network databases, cloud storage devices, or the like provided by another device (e.g., online application or 3rd party provider) or an object 103A-103N, such as a Network Attached Storage (NAS) device or devices, or as a separate database server or servers. The object data repository 225 may comprise data received from the widget configuration server 210 (e.g., via a memory 201 and/or processor(s) 202) and/or an object 103A-103N, and the corresponding storage device may thus store this data. The object data repository 225 includes information accessed and stored by the widget configuration server 210 to facilitate the operations of the asset management system 200. For example, the object data repository 225 may include, without limitation, object identifiers, object type identifiers, attribute data, attachment data, object type data, ticket data, comment data, history data, inbound reference data, outbound reference data, and the like.

The user profile repository 230 may be stored by any suitable storage device configured to store some or all of the information described herein (e.g., memory 201 of the widget configuration server 210 or a separate memory system separate from the widget configuration server 210, such as one or more database systems, backend data servers, network databases, cloud storage devices, or the like provided by another device (e.g., online application or 3rd party provider) or an object 103A-103N, such as a Network Attached Storage (NAS) device or devices, or as a separate database server or servers. The user profile repository 230 may comprise data received from the widget configuration server 210 (e.g., via a memory 201 and/or processor(s) 202) and/or an object 103A-103N, and the corresponding storage device may thus store this data. The user profile repository 230 includes information accessed and stored by the widget configuration server 210 to facilitate the operations of the asset management system 200. For example, the user profile repository 230 may include, without limitation, user identifiers, user profile data, user role data, object identifiers, object type identifiers, and the like.

The client devices 101A-101N may be implemented as any computing device as defined above. Electronic data received by the widget configuration server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the widget configuration interface to generation of an widget component interface template. The depiction in FIG. 2 of "N" client devices is merely for illustration purposes. According to some embodiments, the client devices 101A-101N may be configured to display an interface on a display of the client device for viewing, creating, editing, and/or otherwise interacting with at least one widget configuration interface, which may be provided by the asset management system 200. According to further embodiments, the client devices 101A-101N may be configured to display an interface on a display of the client device for viewing at least one object page interface, which may be provided by the asset management system 200. In some embodiments, a widget component of one client device 101A may be different from a widget component of another client device 101N.

In embodiments where a client device 101A-101N is a mobile device, such as a smartphone or tablet, the client device 101A-101N may execute an "app" to interact with the asset management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the asset management system 200 via a web browser. As yet another example, the client devices 101A-101N may include various hardware or firmware designed to interface with the asset management system 200.

Each of objects 103A-103N is a digital representation that of an asset that may be of various object types, such as a physical asset (e.g., computer, office furniture, vehicle, real estate, etc.), a digital asset (e.g., software), a piece of data, a person (e.g., new employee), or any other tangible or intangible asset (e.g., intellectual property) that may be registered, known, or accessed by the asset management system 200. For example, an object may be a laptop or other IT-related item wherein object data, such as attributes, ticket information, comments, and the like, for the object is uploaded or otherwise stored in a data repository accessible (e.g., object data repository 225) by the asset management system 200. In one non-limiting example, an object 103A may be an employee, or the like, which is an asset of an enterprise.

Example Apparatus for Implementing Embodiments of the Present Disclosure

With reference to FIG. 2, in accordance with some example embodiments, the apparatus may be embodied by one or more computing systems, such as widget configuration server 210. The widget configuration server 210 may include various means, such as memory 201, processor 202, input/output circuitry 203, and/or communications circuitry 204. In some embodiments, widget configuration circuitry 205 and/or widget suggestions circuitry 206 may also or instead be included. The widget configuration server 210 may be configured, using one or more of the circuitry 201, 202, 203, 204, 205, and 206 to execute the operations described above with respect to FIG. 1 and below in connection with FIGS. 3-8B.

Although the use of the term "circuitry" as used herein with respect to components 201-206 of the widget configuration server 210 are described in some cases with respect to functional limitations, it should be understood that the particular implementations necessarily include the use of particular hardware configured to perform the functions associated with the respective circuitry as described herein. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, other elements of the widget configuration server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of the widget configuration server 210. The memory 201 is non-transitory and may include, for example, one or more volatile and/or non-volatile memories. In other words, for example, the memory 201 may be an electronic storage device (e.g., a computer readable storage medium). The memory 201 may be configured to store information, data, content, applications, instructions, or the like, for enabling the widget configuration server 210 to carry out various functions in accordance with example embodiments of the present disclosure. Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data (including object data), applications, templates, instructions, or the like for enabling widget configuration server 210 to carry out various functions in accordance with example embodiments of the present disclosure. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by widget configuration server 210 during the course of performing its functionalities.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as the widget configuration server 210. The plurality of processors may be in operative communication with each other and may be collectively configured to perform one or more functionalities of widget configuration server 210 as described herein.

In an example embodiment, the processor 202 is configured to execute instructions stored in the memory 201 or otherwise accessible to the processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed. For example, these instructions, when executed by processor 202, may cause widget configuration server 210 to perform one or more of the functionalities of widget configuration server 210 as described herein, such as those discussed in connection with FIGS. 1-8B.

In some embodiments, the widget configuration server 210 may include input/output circuitry 203 that may, in turn, be in communication with processor 202 to provide an audible, visual, mechanical, or other output to a user and/or, in some embodiments, to receive an indication of a user input. The input/output circuitry 203 may comprise a user interface (e.g., a widget configuration interface, a dashboard interface, etc.) and may comprise a web user interface, a mobile application, a client device, a kiosk, or the like. In some embodiments, the input/output circuitry 203 may also include a keyboard, a mouse, a joystick, a touch screen, touch areas, soft keys, hard keys, a microphone, a speaker, or other input/output mechanisms. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced, and in some embodiments (like other components discussed herein), input/output circuitry 203 may even be eliminated. Alternatively, at least some aspects of input/output circuitry 203 may be embodied on an apparatus used by a user that is in communication with widget configuration server 210. Input/output circuitry 203 may be in communication with the memory 201, communications circuitry 204, and/or any other component(s), such as via a bus. One or more input/output circuitry 203 and/or other component can be included in widget configuration server 210.

The communications circuitry 204 may be any means such as a device or circuitry embodied in either hardware or a combination of hardware and software that is configured to receive and/or transmit data from/to a network and/or any other device, circuitry, or module in communication with widget configuration server 210. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the widget configuration server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of widget configuration server 210, such as via a bus.

The widget configuration circuitry 205 includes hardware components and/or software configured to support widget configuration-related functionality, features, and/or services of the widget configuration server 210. The widget configuration circuitry 205 may utilize processing circuitry, such as the processor 202, to perform its corresponding operations, and may utilize memory 201 to store collected information. The widget configuration circuitry 205 may send and/or receive data from widget component interface template repository 215, widget repository 220, object data repository 225, and/or user profile repository 230. In some implementations, the sent and/or received data may include user identifier(s), widget component interface template(s), object type(s), object data, and associated data that is configured for association with one or more widget component interface templates. It should also be appreciated that, in some embodiments, the widget configuration circuitry 205 may include a separate processor, specially configured field programmable gate array (FPGA), or application specific interface circuit (ASIC) to perform its corresponding functions.

The widget suggestions circuitry 206 includes hardware and software configured to support widget suggestions-related functionality, features, and/or services of the asset management system 200. The widget suggestions circuitry 206 may utilize processing circuitry, such as the processor 202, to perform these actions. The widget suggestions circuitry 206 may send and/or receive data from widget component interface template repository 215, widget repository 220, object data repository 225, and/or user profile repository 230. In some implementations, the sent and/or received data may be user identifier(s), user profile data, widget configuration item suggestions, object data, recency data, and associated data that is configured for association with one or more widget components and widget configuration interfaces. It should also be appreciated that, in some embodiments, the widget suggestions circuitry 206 may include a separate processor, specially configured field programmable gate array (FPGA), or application specific interface circuit (ASIC).

It is also noted that all or some of the information discussed herein can be based on data that is received, generated, and/or maintained by one or more components of the widget configuration server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of widget configuration server 210.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In various embodiments of the present disclosure, an apparatus (e.g., widget configuration server 210) is configured to manage a widget configuration interface of an asset management system. FIG. 3 illustrates an example widget configuration interface 300 structured in accordance with various embodiments of the subject disclosure. The depicted widget configuration interface 300 presents a widget title creation interface component 301, a widget configuration item selection interface 302, and an accessibility selection interface 303. The depicted widget configuration interface 300 optionally presents an object type selection interface 304, an object selection interface 305, and/or a preview executable interface element 320, as described herein. In certain embodiments, the user is provided with instructions on using the widget configuration interface 300 to configure or customize the layout, structure, access, and/or object information to be visually represented in widget component of the asset management system.

In some embodiments, the apparatus (e.g., widget configuration server 210) causes rendering of the widget configuration interface 300 to a visual display of a computing device (e.g., a client device 101A-101N) in response to receiving a widget configuration request. In some embodiments, the user accesses the widget configuration interface 300 by verbal command, gesture, on-screen dynamics (e.g., soft key), or other types of input indications that may facilitate generating a widget configuration request at the computing device. In one embodiment, a "Configure" icon, actuator button, or other executable interface element is rendered to an interface of the computing device that, when selected by the user, causes the computing device to generate and transmit a widget configuration request to the apparatus. For example, in response to the user clicking or activating the "Configure" actuator button, the computing device generates and transmits a temporary code representative of a widget configuration request to the widget configuration server 210. In response to the receipt of the widget configuration request by the widget configuration server 210, the widget configuration interface 300 is rendered to the visual display of the computing device. In other embodiments, an executable interface element corresponding to the widget configuration request is accessible via a drop-down menu rendered to the system interface. Such examples, however, are for purposes of illustration and not of limitation and other suitable variations of facilitating the generation of a widget configuration request are also contemplated by this disclosure as will be apparent to one of ordinary skill in the art.

In some embodiments, the widget configuration request comprises a unique user identifier associated with the user. In some embodiments, a client device 101A-101N may receive or access the user identifier. For example, the user identifier may be received remotely, via wireless communication or tethered communication, or directly, via input into one of the devices 101A-101N. In some embodiments, the user may have a remote device, such as a mobile device or key fob that interacts with the devices 101A-101N to transmit an user identifier and/or other related user data to authenticate the user. In another example, a user may simply provide login credentials through the interface of their client device 101A-101N. The client device 101A-101N then transfers the unique user identifier to the apparatus (e.g., the widget configuration server 210) as part of or in addition to the widget configuration request.

In some embodiments, a client device 101A-101N may receive or access the user identifier. For example, the user identifier may be received remotely, via wireless communication or tethered communication, or directly, via input into one of the devices 101A-101N. In some embodiments, the user may have a remote device, such as a mobile device or key fob that interacts with the devices 101A-101N to transmit an user identifier and/or other related user data to authenticate the user. In another example, a user may simply provide login credentials through the interface of their client device 101A-101N. The client device 101A-101N then transfers the unique user identifier to the apparatus (e.g., the widget configuration server 210) as part of or in addition to the widget configuration request. In still further embodiments, the widget configuration request comprises one or more object type identifiers, each object type identifier associated with a selected object type. In a non-limiting example, a "Configure" actuator button or drop-down menu selected by a user may be associated with a selected object type(s).

Returning to FIG. 3, the depicted widget configuration interface 300 presents a widget title creation interface component 301. The widget title creation interface component 301 is rendered as a configurable portion of the widget configuration interface 300 and is configured for, among other things, user entry of a user-defined widget title text component as explained in more detail below. In some embodiments, the widget title creation interface component 301 is configured for population with images, such as images stored in a Join Photographic Experts Group (JPEG), Graphics Interchange Format (GIF), or Bitmap (BMP) format. For example, in some embodiments, user interaction with the widget title creation interface component 301 (e.g. entering a widget title text component) triggers an authorization confirmation interface comprising a save changes confirmation component (e.g., "Confirm" actuator button) to be rendered to the widget configuration interface 300. Detection of user engagement with the save changes confirmation component triggers a widget title creation request that is transmitted to and stored by the widget configuration server. In still further embodiments, user interaction with or selection by the user of a "Save" icon, actuator button, or other executable interface element 310 associated with the widget title creation interface component 301 triggers a widget title creation request that is transmitted to and stored by the widget configuration server 210.

The depicted widget configuration interface 300 also presents a widget configuration item selection interface 302. The widget configuration item selection interface 302 is rendered as a "pane" or configurable portion of the widget configuration interface 300. The widget configuration item selection interface 302 is configured to enable a user to view and interact with the interface in order to select one or more widget configuration items to be rendered as one or more widget content interface components to a widget component interface template and/or a widget component. In some embodiments, the user can indicate a desire to add and/or configure a particular widget configuration item by selecting a widget configuration item in a variety of ways. For example, in a non-limiting exemplary embodiment, the available widget component items of the widget configuration item selection interface 302 are rendered as clickable icons, such that user interaction with the clickable icon (e.g., the user clicking or activating the clickable icon) associates the selected widget configuration item (e.g., the corresponding widget content interface component) with the widget component interface template. In some embodiments, the available widget component items of the widget configuration item selection interface 302 are rendered in a series of one or more drop-down menus as depicted in FIG. 3. For example, in some embodiments, available widget configuration items are grouped into categories corresponding to pre-defined widget components. To provide further context, in some embodiments, one or more widget configuration items are associated with a pre-defined widget component identifier. In a non-limiting exemplary embodiment, a first drop-down menu component comprises one or more widget configuration items associated with a pre-defined attributes widget component such that the one or more widget configuration items are each associated with a pre-defined attributes widget component identifier. In some embodiments, the apparatus queries a repository, such as widget repository 220, based on, for example, the pre-defined attribute widget component identifier, retrieves pre-defined widget configuration items returned by the query, and populates the drop-down menu with returned widget configuration items. To provide further context, when a user selects the first drop-down menu component, i.e., a drop-down menu containing pre-defined attributes widget configuration items in this example, such as a status widget configuration item, a business service owner widget configuration item, a service group widget configuration item, and the like, are displayed and configured for user selection (e.g., clickable). Another drop-down menu component contains pre-defined connected tickets configuration items, such as a display connected tickets widget configuration item, such that each of the widget configuration items displayed in the second drop down menu are associated with a pre-defined connected tickets widget component identifier. Additional pre-defined widget components include, but are not limited to, attachments widget component, inbound references widget component, history widget component, query widget component, and the like. Such arrangement allows the user to select certain widget configuration items from various and different pre-defined widget components to be rendered as widget content interface components in a user-defined widget component to be generated. For example, in some embodiments, the widget configuration item selection interface comprises at least one widget configuration item associated with a first pre-defined widget component (e.g., attachments widget component) and at least one widget configuration item associated with a second pre-defined widget component (e.g., history widget component). Accordingly, a widget configuration interface structured in accordance with various embodiments of the present disclosure enables a user to generate a customized widget component comprising widget configuration items from various and different pre-defined widget components by making such distinct widget configuration items available to the user.

Additionally or alternatively, in some embodiments, the widget configuration interface is configured such that selection of a widget configuration item presents an associated sub-selection interface element. For example, in the non-limiting exemplary embodiment describing a second drop-down menu component containing pre-defined connected tickets configuration items (e.g., a display connected tickets widget configuration item), when a user selects the display connected tickets widget configuration item, the widget configuration interface renders an associated sub-selection interface element (e.g., number of connected tickets to display sub-selection), allowing user selection of one or more sub-selection options (e.g., 5, 10, 15, or a user-defined text entry).

Additionally or alternatively, the available widget component items of the widget configuration item selection interface 302 are rendered in association with checkbox interface elements. In certain embodiments, interaction with a checkbox interface element in the widget configuration item selection interface 302 causes the associated widget component to present or not present the user with the widget content interface component corresponding to the associated widget configuration item. A user indicates a desire for the selected widget configuration item to be made available in the widget content interface component of the widget component interface template (and the associated widget component) by "checking" the checkbox interface element associated with the respective widget configuration item. The user indicates a desire for the selected widget configuration item to not be made available in the widget content interface component of the widget component interface template by "unchecking" the checkbox interface element associated with the respective widget configuration item. It should be readily appreciated that the widget configuration items provided to the widget configuration item selection interface 302 are not limited to such clickable icons, drop-down menus, or checkbox interface elements. Available widget configuration items can be associated with any user interface component or element configured to allow selection of one or more widget configuration items.

It also should be readily appreciated that the widget configuration items provided to the widget configuration item selection interface 302 are not limited to such pre-defined widget configuration items. For instance, in some embodiments, the pool of widget configuration items made available to the widget configuration item selection interface 302 is permissions- and/or role-specific such that the pool of widget configuration items is filtered to only provide those widget configuration items that the specific user is allowed to use and/or access. For example, in a non-limiting exemplary embodiment, certain widget configuration items associated with an employee object type, such as salary information or employee review information, is made accessible to a user in a supervisory role in the HR department of an organization, however, is not accessible to an entry-level user in the same department. Such embodiments can be implemented with associated permissions levels associated with the widget configuration items and corresponding permissions or roles information associated with a user identifier. Such permissions level example is for purposes of illustration and not of limitation and other suitable variations of executing permissions- and/or role-specific widget configuration items are also contemplated by this disclosure as will be apparent to one of ordinary skill in the art.

In still further embodiments, the widget configuration server 210 (e.g., via widget suggestions circuitry 206) is configured to determine and recommend one or more widget configuration item suggestions. For example, in some embodiments, the user indicates a desire to add and/or configure a widget configuration item by selecting a "+" icon, actuator button, or other executable interface element 315 rendered to the widget configuration item selection interface 302, such selection or interaction causing the widget configuration item selection interface 302 to present the user with one or more widget configuration item suggestions (e.g., in response to the user selecting a "+" actuator button 315, the client device 101A-101N generates and transmits a temporary code representative of a widget configuration item suggestion request to the widget configuration server 210 causing the widget suggestions circuitry 206 to determine a widget configuration item suggestion or set of widget configuration item suggestions). In still further embodiments, user interaction with a drop-down menu actuator button associated with the widget configuration item selection interface 302 triggers the widget configuration server 210 to cause rendering of a drop-down menu of one or more widget configuration item suggestions. In still further embodiments, no additional user interaction or indication on behalf of the user is required such that the widget configuration item selection interface 302 automatically presents the user with one or more widget configuration item suggestions. For instance, in a non-limiting exemplary embodiment, the widget configuration interface request also comprises a widget configuration item suggestion request such that the widget configuration item selection interface 302 is initially rendered with one or more widget configuration item suggestions without additional input required from the user.

In some embodiments, the widget configuration server 210 is configured to utilize data values and/or analytics (e.g., user profile data, historical widget interaction data, and/or the like) to inform the determination of one or more recommended widget configuration item suggestions. For example, in some embodiments, the widget suggestions circuitry 206 retrieves and analyzes data related to the user identifier, the user profile data, historical data associated with widget configuration item and/or widget content interface component usage, or even the asset management system as a whole, in order to determine widget configuration item suggestions. In the case of the user identifier, the widget suggestions circuitry 206 retrieves user profile data associated with the user identifier of the user configuring the widget configuration interface 300 from one or more repositories (e.g., widget component interface template repository 215, widget repository 220, object data repository 225, and/or user profile repository 230). User profile data may contain various information attributed to or associated with the user, such as user preference data, user profile data, user role data, and historical data associated with widget configuration item(s) and/or widget content interface component(s). For example, user role data may refer to the position, type of role, status, or the like of the user within the organization or commercial enterprise associated with the asset management system 200. For purposes of illustration and not of limitation, in an instance, a user associated with a particular company or organization may be associated with "IT", "HR", "supervisor", and/or the like. In some embodiments, user preference data refers to selections, preferences, and the like previously provided by the user and associated with the user identifier (e.g., in conjunction with a previous widget configuration interface, user identified one or more widget configuration items as "Favorite(s)", thereby indicating a user preference for such widget configuration items).

From historical widget interaction data, potential widget configuration item suggestions may be determined based on the frequency and/or recency of interactions with or usage of widget configuration items and/or widget content interface components associated with the user and/or other users within the asset management system 200. In some embodiments, such interactions with widget configuration items and/or widget content interface components may reveal one or more widget configuration items of current significance to the user. The higher the level of such interactions (e.g., user activity) may suggest relevancy of such widget configuration items and/or widget content interface components. For purposes of illustration and not of limitation, in an instance, 5 of the last 7 widget configuration items selected by the particular user in creation of a user-defined widget component may have included the "status" attribute widget configuration item. Based on analysis of this historical widget interaction data, the widget suggestions circuitry 206 may include the "status" attribute widget configuration item one of a plurality of recommended widget configuration item suggestions in the widget configuration item suggestions set. It should be readily appreciated that potential sources of data and data analytics for determining widget configuration item suggestions is not limited to such user identifier, user profile data, user preference data, and historical data associated with widget configuration item usage, and the widget configuration server 210 is configured to utilize additional and/or alternative data values and/or analytics to inform the determination of recommended widget configuration item suggestions. It is further contemplated that the widget suggestions circuitry 206 may use any combination of such data items in its determination of widget configuration item suggestions. In a non-limiting illustration, potential widget configuration item suggestions may be determined based on an analysis of the combination of user role data (e.g., data corresponding to other users of the same or similar role as user in the organization) and frequency and/or recency of interactions with or usage of widget configuration items and/or widget content interface components within the asset management system 200.

The widget suggestions circuitry 206 is also configured to prioritize and/or rank widget configuration item suggestions. That is, in some embodiments, the widget suggestions circuitry 206 assigns scores and/or weights to widget configuration items and then uses the scored and/or weighted widget configuration items to determine widget configuration item suggestions. The widget suggestions circuitry 206 assigns scores and/or weights pursuant to any of a plurality of methods. For purposes of illustration and not of limitation, in an instance, the widget suggestions circuitry 206 is configured to determine and assign a relevancy score based on such factors as frequency and recency of use. Such scoring example is for purposes of illustration and not of limitation and other suitable variations of assigning scores or weighting the widget configuration items and/or widget content interface component in are also contemplated by this disclosure as will be apparent to one of ordinary skill in the art.

In some example embodiments, the widget suggestions circuitry 206 scores and/or weights the widget configuration items and determines recommended widget configuration item suggestions based in part on comparing a ranking of each widget configuration item suggestion to a predetermined threshold. For example, in some embodiments, the widget configuration item selection interface 302 is predefined to include or render a predetermined number (e.g., 10) of widget configuration item suggestions. As such, in an example embodiment, the top number (e.g. top 10) of widget configuration item suggestions in the ranking (e.g., widget configuration items with the top 10 scores after scoring the widget configuration items) corresponding to the predetermined number (e.g., 10) of widget configuration item suggestions defined for inclusion in the widget configuration item selection interface 302 in order to define a widget configuration item suggestions set. In an alternative example embodiment, the widget suggestions circuitry 206 determines that potential widget configuration items having a score above a predetermined threshold (e.g., 0.75) is included in the widget configuration item selection interface 302 as a widget configuration item suggestions set.

The depicted accessibility selection interface 303 is configured to allow a user to specify the accessibility of the widget component to be generated. In some embodiments, the accessibility selection interface 303 is configured to enable the user to associate the widget component to be generated with one or more interfaces associated with the asset management system 200. For example, in a non-limiting exemplary embodiment, the user may associate the widget component to be generated with one or more of object page configuration interface(s), object interface(s), dashboard interface(s), search interface(s), home page interface(s), reports interface(s), and the like. In still further embodiments, the user may specify that the widget component to be generated be accessible via a tool bar or other interface element not associated with the asset management system 200, such that the widget component is rendered (e.g., accessible to the user) as a stand-alone distinct component without requiring that the asset management system 200 otherwise be operating in the foreground or background of the visual display of the client device 101A-101N. For example, in some embodiments, user interaction with such a stand-alone distinct component initiates communication with the asset management system 200 to access the relevant object data to populate the widget component. In still further embodiments, the widget component may be made accessible via cross-app integration. For example, in some implementations, the accessibility selection interface 303 provides an export feature selection (e.g., "Export To" as depicted in FIG. 3), the selection of which indicates the user's desire to make the resulting widget component available to other external applications (e.g., such as via iframe implementation). In some embodiments, a further drop-down menu or entry component (not depicted) is rendered in response to the user's selection of such export feature selection to allow the user to identify other and/or third-party applications in which the widget component should be made accessible. A majority of the accessibility selection interface 303 in FIG. 3 is depicted as a checkbox menu, however, other variations of the accessibility selection interface 303 are also contemplated by this disclosure as will be apparent to one of ordinary skill in the art.

Returning to FIG. 3, the depicted widget configuration interface 300 optionally presents an object type selection interface 304. The object type selection interface 304 is rendered as a configurable portion of the widget configuration interface 300, the object type selection interface 304 configured to enable a user to view and interact with the interface in order to select one or more object types to be associated with the widget component interface template and widget component to be generated. Exemplary object types include but are not limited to file system, network (e.g., LAN, WAN, VPN), hardware (e.g., host device, client device, computer, desktop, laptop, server, mobile device, printer, modem), software (e.g., application, operating system), accessory, cloud, employee, location, intellectual property (e.g., copyright, license), etc. In a non-limiting example, a drop-down menu or an otherwise executable interface element associated with respective available object types is rendered to the object type selection interface 304 and selected by a user, thereby causing the client device 101A-101N to generate an object type selection request, the object type selection request comprising an object type identifier associated with each selected object type. In some embodiments, the client device 101A-101N transmits the object type selection request comprising the object type identifier(s) to the apparatus (e.g., widget configuration server 210) in response to such user interaction with the object type selection interface 304. In some embodiments, the optional selection of an object type in the object type selection interface 304 can be used to filter the available widget configuration items provided to and/or available for selection from the widget configuration item selection interface 302. For example, in some embodiments, the available object data (i.e., and therefore, corresponding widget configuration items) associated with a host type can differ from the available object data (i.e., and consequently, corresponding widget configuration items) associated with an employee type.

In some embodiments, by selecting two or more object types, the corresponding widget component interface template and widget component are associated with such two or more selected object types, allowing the corresponding widget component to be accessible and/or available to be used with such two or more object types. For example, in a non-limiting exemplary example, in response to user interaction with the object type selection interface 304 corresponding to the selection of four different object types (e.g., "Host", "Client", "Employee", and "Accessory"), the corresponding widget component could be used with objects of such selected four different object types. To provide further context, a user may desire a widget component which provides certain common object data (e.g., title/name, location, and connected tickets) for multiple different object types. In still further embodiments, by selecting two or more object types, the corresponding widget component is configured to display two or more object types concurrently, allowing comparison by the user of objects of such two or more object types.

Although not depicted, in some embodiments, the widget configuration interface 300 optionally presents an object selection interface. The object selection interface is rendered as a configurable portion of the widget configuration interface 300, the object selection interface configured to enable a user to view and interact with the interface in order to select one or more objects to be associated with the widget component interface template to be generated. For example, in some embodiments, by selecting two or more objects, the corresponding widget component is configured to display two or more objects concurrently, allowing comparison by the user of the two or more objects. In a non-limiting example, a drop-down menu or an otherwise executable interface element is rendered to the object selection interface and selected by a user, thereby causing the client device 101A-101N to generate an object selection request, the object selection request comprising an object identifier associated with each selected object. In some embodiments, the client device 101A-101N transmits the object selection request comprising the object identifier(s) to the apparatus (e.g., widget configuration server 210) in response to such user interaction with the object selection interface.

The depicted widget configuration interface 300 optionally presents a preview executable interface element 320, which may be depicted by a representative button or other executable interface element that the user may click, select, or otherwise interact with to indicate selection of the preview executable interface element 320. In some embodiments, selection of the preview executable interface element 320 causes (i.e., initiates a preview changes request) rendering of a preview interface component (not depicted) to the widget configuration interface 300, the preview interface component providing a widget configuration preview to the user so that the user can preview additions and/or changes to the template before additions and/or changes are actually initiated, made, and/or saved to the template. For example, when the user selects the preview executable interface element 320 in the widget configuration interface 300, the details of the pending additions and/or changes to be initiated, made, and/or saved to the widget configuration template in the event that the pending additions and/or changes are applied to the widget configuration template are depicted in a preview interface component rendered to a visual display of the user. In some embodiments, in response to any selections and/or changes detected in the widget configuration interface 300, the asset management system 200 (e.g., via the widget configuration server 210 and/or the client device 101A-101N automatically or programmatically causes rendering of the preview interface component to the visual display of the client device 101A-101N, without requiring affirmative user engagement with a preview executable interface element 320.

In some embodiments, the apparatus (e.g., widget configuration server 210) receives one or more widget configuration item selection requests in response to user interaction with the widget configuration item selection interface 302. For example, in some embodiments, interaction with the widget configuration interface 300 and/or the widget configuration item selection interface 302 is structured in association with a client session. For example, in some embodiments, a client session is initiated at the client device 101A-101N upon detection of a user indication to configure a widget component (e.g., interaction with a "Configure" button to generate a widget configuration request). In some embodiments, the client session monitors user interaction with the widget configuration interface 300 (and/or particular selection interfaces in the widget configuration interface 300) to detect and store each selection request generated each time the user adds, removes, reorders, and/or otherwise interacts with the respective widget configuration interface 300 (and/or particular selection interfaces in the widget configuration interface 300) to configure a widget component. The selection request(s) (e.g., widget title creation request, widget configuration item selection request, accessibility selection request, and the like) are transmitted to the widget configuration server 210 upon selection by the user of a "Save changes" or "Save" icon, actuator button, or other executable interface element 310 rendered to the widget configuration interface 300. In some embodiments, the client device 101A-101N and/or the widget configuration server 210 triggers a change authorization confirmation interface 400 comprising a save changes confirmation component (e.g., "Confirm" actuator button) 401 to be rendered to the widget configuration interface 300, as depicted in the exemplary embodiment illustrated in FIG. 4. Upon detection of user engagement with the save changes confirmation component 401, a widget component interface template, as described in detail herein, is generated and stored in accordance with the client session.

Additionally or alternatively, a widget selection request is generated by the client device 101A-101N and transmitted to the widget configuration server 210 each time the user adds, removes, reorders, renames, and/or otherwise interacts with the respective selection interfaces to configure a widget component. In some embodiments, the widget configuration item selection interface 302 is configured to enable a user to remove or delete a selected widget component item from the widget configuration item selection interface 302, such that the selected widget configuration item is not rendered in the associated widget component interface template and/or widget component to be generated. For instance, as described previously, "unchecking" a checkbox interface element associated with a widget configuration item indicates a desire by the user to remove or delete a widget configuration item. In some embodiments, the user indicates a desire to remove or delete a widget configuration item by selecting a trash can icon, a "Remove" actuator button, or other executable interface element 308 rendered to the widget configuration item selection interface 302. Detection of such selection or interaction triggers a delete confirmation component to be displayed to the visual display. A delete confirmation component is configured to allow the user to confirm deletion of the selected widget configuration item by further selecting or interacting with a, for example, "delete" or "confirm" actuator button or to cancel deletion of the selected widget configuration item by further selecting or interacting with, for example, a "cancel" actuator button. In response to a selection by the user, a respective delete confirmation request or cancel delete request is generated and transmitted to the widget configuration server 210.

In some embodiments, one or more of the widget configuration item selection requests includes an arrangement selection request, each arrangement selection request defining a widget configuration item position associated with the widget configuration item. For example, the rendering of the corresponding widget content interface components in the widget component to be generated may be ordered in a myriad of ways via the widget configuration interface 300. In one embodiment, the widget configuration server 210 causes ordering of the display of the widget content interface components based on the alphabetical sequence of the title(s) of the widget content interface component(s). In other embodiments, the display of the widget content interface components is ordered based on a predefined sequence or hierarchy of the associated widget configuration items. In some embodiments, the widget configuration item selection interface 302 is configured to enable a user to order the respective widget configuration items to be rendered as widget content interface components in the widget component interface template and/or widget component. For example, in some instances, the user indicates a desire to reorder a widget configuration item by selecting a widget configuration item and moving the selected widget configuration item to a position of choice or priority in a collection of widget configuration items to be displayed. To provide further contest, the user may define a "drag and drop" of the selected widget configuration item by clicking on the widget configuration item in a first point of the widget configuration item selection interface 302 and continuously moving the selected widget configuration item to a second point in a different region of the collection of widget configuration items displayed in the widget configuration item selection interface 302, thereby generating an arrangement selection request associated with a widget configuration item selection request, the arrangement selection request defining a widget configuration item position associated with the widget configuration item. Additionally or alternatively, the arrangement of the collection of widget configuration items is not limited to a list format and such widget configuration items (and corresponding widget content interface components) can be arranged in any hierarchy or layout, including, for example, in the form of or in association with one or more images, such as images stored in a Join Photographic Experts Group (JPEG), Graphics Interchange Format (GIF), or Bitmap (BMP) format. For instance, the widget configuration item selection interface 302 may provide any arrangement of a plurality of regions corresponding to the layout or structure of the widget component to be generated. In another non-limiting example, the object data associated with the widget configuration item corresponds to an image. For example, an object graph may be a selected widget configuration item such that the apparatus causes rendering of an object graph demonstrating the relationship of the selected item as part of the instantiated widget component.

Additionally or alternatively, in some embodiments, one or more of the widget configuration item selection requests includes a dimensions selection request. For example, in some embodiments, the user is able to configure size (e.g. specific dimensions and/or size) of a particular widget content interface component corresponding to a selected widget configuration item. For instance, upon selection of a widget configuration item, in some embodiments, a dimensions selection interface is rendered to the widget configuration interface 300 allowing the user to select, identify, and/or define one or more dimensions of the associated widget content interface component via the dimension selection interface.

In some embodiments, the apparatus (e.g., widget configuration server 210) generates a widget component interface template. The widget component interface template defines access to object device data via the widget component and provides the format, layout, organization, structure, arrangement, parameters, and/or display of content and/or information used to render a widget component in the asset management system 200. In some embodiments, the widget component interface template comprises a widget title component, at least one widget content interface component, and at least one accessibility component. Accordingly, such arrangement(s) of a widget title component, widget content interface component(s) and access component(s) correspond to the selection, addition, deletion, renaming, reordering, etc. of the widget title, widget configuration items, and/or accessibility components by the user as described herein. For instance, the apparatus generates a widget component interface template based at least upon the received widget title creation request, widget configuration item selection requests, and accessibility selection requests.

In still further embodiments, the widget component interface template includes data defining the structure of a widget component to be generated, such as the location, size, type, and quantity of widget content interface components and/or widget title components within the widget component. Object data, widget title components, and/or widget content interface components to be rendered in association with a widget component may conform to the limitations of each particular widget content interface components and/or widget title component. For example, in some embodiments, the object data populated to a selected widget content interface component is resized and/or reformatted to fit within the boundaries or parameters of the widget content interface component as defined by the widget component interface template (e.g., in accordance with the receipt of arrangement selection requests and/or dimensions selection request(s) as described herein).

In some embodiments, the apparatus (e.g., widget configuration server 210) causes storage of the generated widget component interface template in an widget component interface template repository 215. In still further embodiments, the widget configuration server 210 causes storage of the generated widget component interface template in association with one or more identifiers. For example, in some embodiments, the widget configuration request comprises a unique user identifier associated with the user and the widget configuration server 210 causes storage of the generated widget component interface template in association with the received user identifier. In some embodiments, the widget component interface template repository 215 comprises a plurality of such user-generated widget component interface templates, each of the widget component interface templates associated with a user identifier such that the widget component interface templates are configured to generate a widget component differently based on the specific user and may present widget components differently based on the particular widget component interface template (e.g., present different widget component to different users). In still further embodiments, the apparatus causes storage of the generated widget component interface template to the widget component template repository in association with the one or more received object type identifier(s) as described herein.

As a non-limiting example, Sally Doe, a user of an asset management system in the HR department of Acme Corporation may configure a user-generated widget component interface template to be associated with an employee object type in order to display certain HR-related attributes of a selected employee asset. By way of example, Ms. Doe configures a widget component interface template to display various HR-related attributes (e.g., a location attribute, a contact information attribute, a start date attribute, a number of years of service attribute, a healthcare benefits attribute, etc.) when she accesses Employee A via her customized widget component. By way of further example, John Smith, a user of the asset management system in the engineering department of Acme Corporation may configure a user-generated widget component interface template to be associated with an employee object type in order to display certain engineering-related attributes of a selected employee asset. For example, Mr. Smith configures a widget component interface template to display various engineering-related attributes (e.g., a location attribute, a contact information attribute, a team member attribute, an associated team members attribute, a direct report attribute, a current assignment attribute, an associated clients attribute, an assigned devices attribute, etc.) when he accesses Employee A via his customized widget component. Each widget component interface template is stored with the unique user identifiers associated with Ms. Doe and Mr. Smith, respectively, such that in response to receiving widget component display requests from each of Ms. Doe and Mr. Smith (e.g. the users each indicate a desire to access and/or display data associated with Employee A via their respective customized widget component), the apparatus retrieves the widget component interface template associated with the respective user identifier from the widget content template repository, and using retrieved object data, renders dynamic instantiations of the generated widget component interface templates to the respective widget components on the visual displays of Ms. Doe's and Mr. Smith's computing devices. Accordingly, in such example, instead of a static or enterprise-wide template, the renderings of the dynamic instantiations of object data associated with Employee A can differ between Ms. Doe and Mr. Smith. For example, Ms. Doe's customized widget component will include the selected HR-related attributes associated with Employee A while Mr. Smith's customized widget component will include the selected engineering-related attributes associated with Employee A, even though the selected object is the same and the object data is retrieved from the same object data repository. Accordingly, users are able to customize the widget component interface template to display user-relevant object data that may differ from user to user.

In still further embodiments, each widget component interface template is associated with a unique widget component template identifier. For example, a user may have multiple, different widget component interface templates associated with a user identifier, each widget component interface template associated with a unique widget component template identifier. A widget component template identifier is one or more items of data by which a widget component interface template is uniquely identified in the asset management system 200. In some embodiments, the widget component template identifier is generated at the client device 101A-101N by the user's confirmation of the client session associated with a widget configuration interface and is transmitted as part of, or in association with, the respective widget configuration request to the widget configuration server 210.

In some embodiments, the asset management system 200 not only allows for generation of new widget component interface templates, but further allows for editing or revision of existing widget component interface templates. In some embodiments, causing storage of a generated widget component interface template in the widget component interface template repository 215 comprises overwriting any prior versions or copies of the selected widget component interface template previously stored in the widget component interface template repository 215 (e.g., a prior version of a selected widget component interface template associated with the same unique widget component interface template identifier). In another embodiment, causing storage of a generated widget component interface template in the widget component interface template repository 215 comprises assigning a new version identifier with each version of a generated widget component interface template (e.g., a new version of a selected widget component interface template associated with the same unique widget component interface template identifier) and storing the version identifier in association with the generated widget component interface template in the widget component interface template repository 215. Such version identifiers enable a user to select from various versions of the widget component interface template (e.g., revert to a prior-saved version of a widget component interface template).

In still further embodiments, the apparatus (e.g., widget configuration server 210) is configured to receive a widget component display request. For example, in response to a user clicking or activating an icon, actuator button, or a reduced format of a widget component, the client device 101A-101N generates and transmits a temporary code representative of the widget component display request to the widget configuration server 210. In some embodiments, the widget component display request comprises a user identifier associated the user and a widget component template identifier associated with the selected widget component.

In some embodiments, the apparatus is configured to retrieve a generated widget component interface template associated with the received user identifier and/or widget component template identifier from the widget component interface template repository 215. For example, in some embodiments, the apparatus queries the widget component interface template repository 215, using the received user identifier and/or widget component template identifier, and retrieves the generated widget component interface template returned by the query.

In some embodiments, the apparatus is configured to retrieve object data associated with one or more objects from an object data repository to populate the retrieved widget component interface template. In a non-limiting exemplary embodiment, the apparatus retrieves object data associated with one or more selected objects from the object data repository 225 and transmits the retrieved object data and widget component interface template to the client device 101A-101N. In some embodiments, the object data is filtered in accordance with widget fields (e.g., widget fields programmatically generated based on the received widget title creation requests and/or widget configuration item selection requests) identified in the widget component interface template at the client device 101A-101N (e.g., via a client application running on the client device 101A-101N), displaying only the object data corresponding to the permitted widget fields and in accordance with the widget component interface template.

Additionally or alternatively, the apparatus is configured to query a repository, such as the object data repository 225, using the user identifier, object identifier, widget component template identifier and/or widget component interface template (e.g., the programmatically generated widget fields) and retrieve a subset of object data returned by the query (e.g., the subset of object data corresponding to the identifier(s) and/or widget fields). For example, in certain embodiments, the widget component interface template comprises widget fields programmatically generated based on the received widget title creation requests and/or widget configuration item selection requests. In response to a user selecting to display the "Status" attribute widget configuration item in association with the widget content interface component (e.g., adding the "status" attribute widget configuration item in the widget configuration item selection interface 302), the corresponding widget component interface template comprises a "Status" attribute widget field in association with the widget content interface component. In a further non-limiting example, in further response to a user selecting to display 5 items per page in association with a connected tickets widget configuration item (e.g., entering "5" in association with a per page item number setting configuration interface in the widget configuration item selection interface), the corresponding widget component interface template comprises 5 widget fields per page in association with the connected tickets widget content interface component of the generated user-defined widget component. In some embodiments, the apparatus advantageously retrieves a smaller subset of data compared to the entirety of object data associated with selected object(s) 103A-103N as a result of reduced widget field requirements, thereby reducing network traffic and data processing requirements, resulting in less strain on the asset management system and leading to increased lifetime and efficiency of the asset management system. In some embodiments, the apparatus is configured to dynamically instantiate the generated widget component interface template with the retrieved subset of object data. For example, in certain embodiments, the widget component template comprises widget fields programmatically generated based on the received widget selection requests and/or widget configuration item selection requests as described herein.

In some embodiments, dynamically instantiating the generated widget component interface template with the retrieved subset of object data comprises programmatically mapping the retrieved subset of object data to one or more of the particular widget fields in the generated widget component interface template. In some embodiments, the apparatus programmatically maps the retrieved subset of object data by populating the corresponding data to the related widget fields in the widget component interface template. For instance, in a non-limiting example, in an instance wherein a user selected the "Status" widget configuration item from an attributes widget configuration item drop-down menu and a "Display Connected Tickets" widget configuration item from a connected tickets widget configuration item drop-down menu, the apparatus populates the corresponding object status data for the selected object 103A-103N to the "Status" attribute widget field and the corresponding ticket item object data for the selected object 103A-103N to widget fields in association with the widget content interface component of the user-defined widget component. In a further non-limiting exemplary embodiment, the subset of object data corresponding to the widget title and one or more widget content interface components corresponding to interaction with the widget title creation interface component 301 and widget configuration item selection interface 302, respectively, are dynamically instantiated (e.g. populated) in accordance with any optional arrangement selection request(s) and/or dimensions selection request(s).

In some embodiments, the apparatus is configured to cause rendering of the dynamic instantiation of the generated widget component interface template to the widget component. For example, FIGS. 5A-5B and 6A-6B depict widget components structured in accordance with embodiments of the present disclosure. FIGS. 5A and 5B depict a non-limiting exemplary embodiment of a customized widget component (e.g., "My Custom Widget") in a reduced format 510 and expanded format 515, respectively, being rendered to an exemplary object interface 500. In the depicted embodiment of FIG. 5A, an example user has selected the "X-43 Computer" object 501, which is displayed to the object interface 500 with a plurality of widget components, both pre-defined widget components 505, 506 and customized widget component(s) 510. Upon selection of the reduced format of the customized widget component 510 in FIG. 5A, the widget configuration server 210 dynamically instantiates the associated widget component interface template with a retrieved subset of object data corresponding to the "X-43 Computer" by programmatically mapping the retrieved subset of object data to the particular widget fields in the widget component interface template and causes rendering of the dynamic instantiation in an expanded format of the widget component 515, as depicted in FIG. 5B. In the depicted embodiment, the widget component 515 is rendered to the visual display of the client device 101A-101N, the widget component 515 comprising a widget title 520 and widget content interface components 525 corresponding to the dynamic instantiation of the generated widget component interface template.

FIGS. 6A and 6B depict a non-limiting exemplary embodiment of a customized widget component (e.g., "My Custom Widget") in a reduced format 610 and expanded format 615, respectively, being rendered to an exemplary dashboard interface 600. In the depicted embodiment of FIG. 6A, an example user is viewing a dashboard interface 600 associated with the asset management system (e.g., asset management system 200), the dashboard interface comprising a plurality of widget components, both pre-defined widget components 605 and a customized widget component 610. Upon selection of two objects (e.g., identification of two objects) in the reduced format of the customized widget component 610 in FIG. 6A, the widget configuration server 210 dynamically instantiates the associated widget component interface template with retrieved subsets of object data corresponding to the "X-43 Computer" and "F1-17 Virtual CPU" by programmatically mapping the retrieved subsets of object data to the particular widget fields in the widget component interface template and causes rendering of the dynamic instantiation in an expanded format of the widget component 615, as depicted in FIG. 6B, the expanded format of the widget component 615 allowing comparison of object data specifically pertinent to the user. In the depicted embodiment, the widget component 615 is rendered to the visual display of the client device 101A-101N, the widget component 615 comprising a widget title 620 and widget content interface components 625 corresponding to the dynamic instantiation of the generated widget component interface template.

Example Operations Performed

Having described the apparatus, system, and exemplary circuitry comprising embodiments of the present disclosure, it should be understood that the apparatus may proceed to manage widget configuration interfaces and widget components of an asset management system in a number of ways. FIG. 7A is a flowchart broadly illustrating a series of operations or process blocks that are executed or performed to generate and store a widget component interface template in an asset management system in accordance with some example embodiments of the present disclosure. The operations illustrated in FIG. 7A may, for example, be performed by, with the assistance of, and/or under the control of an apparatus (e.g., widget configuration server 210), as described above. In this regard, performance of the operations may invoke one or more of memory 201, processor 202, input/output circuitry 203, communications circuitry 204, widget configuration circuitry 205, and/or widget suggestions circuitry 206.

In the embodiment illustrated in FIG. 7A, the flowchart illustrates method 700 which includes receiving a widget configuration request comprising a first user identifier associated with a first user at Block 702. For example, the widget configuration server 210 may include means, such as the processor 202, communications circuitry 204, widget configuration circuitry 205, or the like, for receiving the widget configuration request.

As shown in Block 704, in some embodiments, the widget configuration server 210 includes means, such as the processor 202, input/output circuitry 203, communications circuitry 204, widget configuration circuitry 205, or the like, to cause rendering of a widget configuration interface to a visual display of a computing device (e.g., a client device 101A-101N) in response to receiving the widget configuration request. A widget configuration interface 300 comprising a widget title creation interface component 301, a widget configuration item selection interface 302, and an accessibility selection interface 303 as shown in FIG. 3 is one example of such rendering. The widget configuration interface may optionally comprise an object type selection interface 304, a preview executable interface element, an object selection interface, and/or an orientation selection interface, the orientation selection interface enabling selection of an arrangement of the widget component as a horizontal and/or vertical widget component in an object interface. In some embodiments, the widget configuration item selection interface 302 comprises one or more widget configuration items, wherein at least one of the one or more widget configuration items comprises a widget configuration item suggestion, the widget configuration item suggestion determined based on user profile data, historical widget interaction data, or combinations thereof. The widget configuration server 210 includes means, such as the processor 202, widget suggestions circuitry 206, or the like, to receive a widget configuration item suggestion request, determine one or more widget configuration item suggestions, and cause rendering at least one of the one or more widget configuration item suggestions to the widget configuration item selection interface 302. In some embodiments, the widget configuration item selection interface comprises at least one widget configuration item associated with a first pre-defined widget component (e.g., attributes widget component) and at least one widget configuration item associated with a second pre-defined widget component (e.g., connected tickets widget component).

At Block 706, the method 700 further includes receiving a widget title creation request in response to user interaction with the widget title creation interface component. For example, the widget configuration server 210 may include means, such as the processor 202, communications circuitry 204, widget configuration circuitry 205, or the like, for receiving such widget title creation requests. For example, in the embodiment depicted in FIG. 4, the example user has selected "My Custom Widget" as the widget title.

As illustrated at Block 708, in some embodiments, method 700 further includes receiving one or more widget configuration selection requests in response to user interaction with the widget configuration item selection interface (e.g., widget configuration item selection interface 302). In some embodiments, such one or more widget configuration item selection requests comprises one or more selected widget configuration item suggestions, one or more pre-defined widget configuration items (e.g., associated with a pre-defined widget component), or combinations thereof. For example, the widget configuration server 210 may include means, such as the processor 202, communications circuitry 204, widget configuration circuitry 205, or the like, for receiving the one or more widget configuration selection requests in response to user interaction with the widget configuration item selection interface (e.g., widget configuration item selection interface 302).

As illustrated at Block 710, in some embodiments, method 700 further includes receiving one or more accessibility selection requests in response to user interaction with the accessibility selection interface (e.g., accessibility selection interface 303). In some embodiments, such one or more accessibility selection requests allow the user to specify the accessibility of the widget component to be generated, such as via a dashboard interface, an object interface, and the like. For example, the widget configuration server 210 may include means, such as the processor 202, communications circuitry 204, widget configuration circuitry 205, or the like, for receiving the one or more accessibility selection requests in response to user interaction with the accessibility selection interface (e.g., accessibility selection interface 303).

At Block 712, the widget configuration server 210 may further include means, such as the processor 202, widget configuration circuitry 205, or the like, to generate a widget component interface template based at least in part on the received creation and selection requests, the widget component interface template comprising a widget title component, at least one widget content interface component, and at least one accessibility component.

At Block 714, the widget configuration server 210 may further include means, such as the processor 202, widget configuration circuitry 205, or the like, to cause storage of the generated widget component interface template in association with the first user identifier in an widget component interface template repository (e.g., widget component interface template repository 215). As described herein, in some embodiments, the present disclosure also contemplates storing the generated widget component interface template in association with one or more object type identifier(s) and/or version identifier(s).

FIG. 7B is a signal diagram of an example data flow represented by method 700. That is, FIG. 7B illustrates an example signal diagram illustrating data flow interactions between a widget configuration server, a repository, and a client device when managing a widget configuration interface in accordance with one embodiment. Method 700 is described as being performed by a client device 101A, a widget configuration server 210, and a widget component interface template repository 215. These may be similar to those previously discussed with regards to FIG. 1.

Turning to FIG. 8A, FIG. 8A is a flowchart broadly illustrating a series of operations or process blocks that are executed or performed to dynamically instantiate a widget component interface template to a widget component in association with a selected object in an asset management system 200 in accordance with some example additional embodiments of the present disclosure. The operations illustrated in FIG. 8A may, for example, be performed by, with the assistance of, and/or under the control of an apparatus (e.g., widget configuration server 210), as described above. In this regard, performance of the operations may invoke one or more of memory 201, processor 202, input/output circuitry 203, communications circuitry 204, widget configuration circuitry 205, and/or widget suggestions circuitry 206.

In the embodiment illustrated in FIG. 8A, the flowchart illustrates method 800 which includes receiving a widget component display request comprising the first user identifier and an object identifier at Block 802. For example, the widget configuration server 210 may include means, such as the processor 202, communications circuitry 204, widget configuration circuitry 205, or the like, for receiving the widget component display request.

As illustrated at Blocks 804 and 806, in some embodiments, method 800 includes retrieving the generated widget component interface template associated with the first user identifier from the widget component interface template repository, wherein the widget component interface template comprises a widget component interface template identifier and retrieving a subset of object data associated with the object identifier and the widget component interface template identifier from an object data repository, respectively. For example, the widget configuration server 210 may include means, such as the processor 202, communications circuitry 204, widget configuration circuitry 205, or the like, for retrieving such generated widget component interface template and subset of object data. In some embodiments, a widget component interface template identifier is not necessary such that all or a large portion of object data associated with the object identifier is retrieved with the client device and/or client session performing filtering of the object data.

At Block 808, the widget configuration server 210 further includes means, such as the processor 202, widget configuration circuitry 205, or the like, for dynamically instantiating the generated widget component interface template with the retrieved subset of object data by programmatically mapping the subset of object data to one or more particular widget fields in the generated widget component interface template. As described herein, in some embodiments, the present disclosure contemplates the widget component interface template comprises widget fields programmatically generated based on the received widget title creations requests and/or widget configuration item selection requests.

At Block 810, the widget configuration server 210 further includes means, such as the processor 202, input/output circuitry 203, widget configuration circuitry 205, or the like, for causing rendering of the dynamic instantiation of the generated widget component interface template to a widget component on the visual display of the computing device (e.g., client device 101A associated with the first user identifier).

FIG. 8B is a signal diagram of an example data flow represented by method 800. That is, FIG. 8B illustrates an example signal diagram illustrating data flow interactions between a widget configuration server, two repositories, and a client device when managing a widget configuration interface in accordance with one embodiment. Method 800 is described as being performed by a client device 101A, a widget configuration server 210, a widget component interface template repository 215, and an object data repository 225. These may be similar to those previously discussed with regards to FIG. 1.

FIGS. 7A, 7B, 8A, and 8B thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the widget configuration server 210 and executed by a processor 202 of the widget configuration server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to manage a widget configuration interface of an asset management system, the apparatus comprising at least one processor and at least one memory, the at least one memory having computer-coded instructions therein, wherein the computer-coded instructions are configured to, in execution with the at least one processor, cause the apparatus to:

receive a first widget configuration request comprising a first user identifier associated with a first user of the asset management system, wherein the asset management system is configured to manage a plurality of assets of an organization, wherein the plurality of assets are organized by object types, and wherein each object type is associated with distinct object parameters;

cause rendering of a first widget configuration interface to a visual display of a computing device associated with the first user identifier in response to receiving the first widget configuration request, wherein the rendering of the first widget configuration interface comprises a simultaneous rendering of a widget title creation interface component, a widget configuration item selection interface, an object type selection interface, and an accessibility selection interface, and wherein the widget configuration item selection interface includes a menu comprising a first widget configuration item set based on a first ranking of widget configuration items, at least one of the widget configuration items of the first widget configuration item set based on user permissions data associated with the first user identifier;

receive a first widget title creation request in response to user interaction with the widget title creation interface component of the first widget configuration interface;

receive a first widget configuration item selection request in response to user interaction with the widget configuration item selection interface of the first widget configuration interface;

receive a first object type selection request in response to user interaction with the object type selection interface of the first widget configuration interface, the first object type selection request corresponding to a selected object type identifier, the selected object type identifier uniquely identifying an object type managed by the asset management system;

receive an accessibility selection request in response to user interaction with the accessibility selection interface of the first widget configuration interface, wherein the accessibility selection request identifies an external application from a plurality of external applications, wherein the external applications are external to the asset management system;

generate a first widget component interface template based at least in part on the received creation and selection requests, the first widget component interface template comprising a widget title component, at least one widget content interface component, and at least one accessibility component;

cause storage of the generated first widget component interface template in association with the first user identifier and the selected object type identifier in a widget component interface template repository;

cause rendering of a first widget component to the visual display of the computing device associated with the first user identifier such that the first widget component is accessible via the external application;

receive a second widget configuration request comprising a second user identifier associated with a second user of the asset management system;

cause rendering of a second widget configuration interface to a visual display of a computing device associated with the second user identifier in response to receiving the second widget configuration request, wherein the rendering of the second widget configuration interface comprises a simultaneous rendering of a widget title creation interface component, a widget configuration item selection interface, an object type selection interface, and an accessibility selection interface, wherein the widget configuration item selection interface includes a menu comprising a second widget configuration item set based on a second ranking of the widget configuration items, at least one of the widget configuration items of the second widget configuration item set based on user permissions data associated with the second user identifier, and wherein the second ranking differs from the first ranking such that the rendering of the second widget configuration item set differs from the rendering of the first widget configuration item set;

receive a second widget title creation request in response to user interaction with the widget title creation interface component of the second widget configuration interface;

receive a second widget configuration item selection request in response to user interaction with the widget configuration item selection interface of the second widget configuration interface;

receive a second object type selection request in response to user interaction with the object type selection interface of the second widget configuration interface, the second object type selection request corresponding to the selected object type identifier;

receive an accessibility selection request in response to user interaction with the accessibility selection interface of the second widget configuration interface;

generate a second widget component interface template based at least in part on the received creation and selection requests, the second widget component interface template comprising a widget title component, at least one widget content interface component, and at least one accessibility component, cause storage of the generated second widget component interface template in association with the second user identifier and the selected object type identifier in the widget component interface template repository, such that each of the generated first widget component interface template and the generated second widget component interface template corresponds to the selected object type identifier.

2. The apparatus of claim 1, wherein at least one of the one or more widget configuration items of the widget configuration item selection interface of the first widget configuration interface comprises a widget configuration item suggestion, the widget configuration item suggestion determined based on user profile data, historical widget interaction data, or combinations thereof.

3. The apparatus of claim 1, wherein the widget configuration item selection interface of the first widget configuration interface comprises at least one widget configuration item associated with a first pre-defined widget component and at least one widget configuration item associated with a second pre-defined widget component.

4. The apparatus of claim 1, the computer-coded instructions are further configured to cause the apparatus to:

receive a first widget configuration item suggestion request;

determine one or more widget configuration item suggestions; and cause rendering of at least one of the one or more widget configuration item suggestions to the widget configuration item selection interface of the first widget configuration interface.

5. The apparatus of claim 4, wherein determining one or more widget configuration item suggestions comprises:
retrieving user profile data associated with the first user identifier from a user profile repository, wherein the user profile data comprises user role data;
identifying a plurality of widget configuration item suggestions based on the user role data;
ranking the plurality of widget configuration item suggestions; and
selecting the one or more widget configuration item suggestions based on the ranking of the plurality of widget configuration item suggestions.

6. The apparatus of claim 1, wherein causing rendering of the first widget component to the visual display of the computing device associated with the first user identifier such that the first widget component is accessible via the external application comprises:
receiving a widget component display request comprising the first user identifier and an object identifier;
retrieving the first widget component interface template associated with the first user identifier from the widget component interface template repository, wherein the first widget component interface template comprises a first widget component interface template identifier;
retrieving a first object data subset associated with the selected object identifier and the first widget component interface template identifier from an object data repository;
dynamically instantiating the first widget component interface template with the retrieved first object data subset by programmatically mapping the first object data subset to one or more particular widget fields in the first widget component interface template; and
causing rendering of the dynamic instantiation of the generated first widget component interface template to the first widget component on the visual display of the computing device associated with the first user identifier such that the first widget component is accessible via the external application.

7. The apparatus of claim 1, wherein a second widget component is rendered to an interface in accordance with the at least one accessibility component associated with the second widget component interface template.

8. The apparatus of claim 7, wherein rendering the second widget component to an interface in accordance with the at least one accessibility component associated with the second widget component interface template comprises:
receiving a widget component display request comprising the second user identifier and an object identifier;
retrieving the second widget component interface template associated with the second user identifier from the widget component interface template repository, wherein the second widget component interface template comprises a second widget component interface template identifier;
retrieving a second object data subset associated with the selected object identifier and the second widget component interface template identifier from an object data repository; and
dynamically instantiating the second widget component interface template with the retrieved second object data subset by programmatically mapping the second object data subset to one or more particular widget fields in the second widget component interface template; and
causing rendering of the dynamic instantiation of the second widget component interface template to the second widget component on the visual display of the computing device associated with the second user identifier.

9. The apparatus of claim 7, wherein the second widget component is rendered to a dashboard interface.

10. The apparatus of claim 7, wherein the second widget component is rendered to an object page interface.

11. The apparatus of claim 1, wherein the object types include one or more of a file system type, a network type, a hardware type, a software type, an accessory type, a cloud type, an employee type, a location type, and an intellectual property type.

12. The apparatus of claim 11, wherein the first and second object type selection requests include an employee type.

13. The apparatus of claim 12, wherein the selected object identifier is an employee identifier.

14. The apparatus of claim 1, wherein the first widget configuration interface further comprises an orientation selection interface, the orientation selection interface configured to receive a selection to render the first widget component in either a vertical arrangement in association with other vertically rendered widget components or a horizontal arrangement in association with other horizontally rendered widget components.

15. A method for managing a widget configuration interface of an asset management system, the method comprising:
receiving a first widget configuration request comprising a first user identifier associated with a first user of the asset management system, wherein the asset management system is configured to manage a plurality of assets of an organization, wherein the plurality of assets are organized by object types, and wherein each object type is associated with distinct object parameters;
rendering a first widget configuration interface to a visual display of a computing device associated with the first user identifier in response to receiving the first widget configuration request, wherein the rendering of the first widget configuration interface comprises a simultaneous rendering of a widget title creation interface component, a widget configuration item selection interface, an object type selection interface, and an accessibility selection interface, and wherein the widget configuration item selection interface includes a menu comprising a first widget configuration item set based on a first ranking of the widget configuration items, at least one of the widget configuration items of the first widget configuration item set based on user permissions data associated with the first user identifier;
receiving a first widget title creation request in response to user interaction with the widget title creation interface component of the first widget configuration interface;
receiving a first widget configuration item selection request in response to user interaction with the widget configuration item selection interface of the first widget configuration interface;
receiving a first object type selection request in response to user interaction with the object type selection interface of the first widget configuration interface, the first object type selection request corresponding to a selected object type identifier, the selected object type identifier uniquely identifying an object type managed by the asset management system;

receiving an accessibility selection request in response to user interaction with the accessibility selection interface of the first widget configuration interface, wherein the accessibility selection request identifies an external application from a plurality of external applications, wherein the external applications are external to the asset management system;

generating a first widget component interface template based at least in part on the received creation and selection requests, the first widget component interface template comprising a widget title component, at least one widget content interface component, and at least one accessibility component;

storing the generated first widget component interface template in association with the first user identifier and the selected object type identifier in a widget component interface template repository;

rendering a first widget component to the visual display of the computing device associated with the first user identifier such that the first widget component is accessible via the external application;

receiving a second widget configuration request comprising a second user identifier associated with a second user of the asset management system;

rendering a second widget configuration interface to a visual display of a computing device associated with the second user identifier in response to receiving the second widget configuration request, wherein the rendering of the second widget configuration interface comprises a simultaneous rendering of a widget title creation interface component, a widget configuration item selection interface, an object type selection interface, and an accessibility selection interface, wherein the widget configuration item selection interface includes a menu comprising a second widget configuration item set based on a second ranking of the widget configuration items, at least one of the widget configuration items of the second widget configuration item set based on user permissions data associated with the second user identifier, and wherein the second ranking differs from the first ranking such that the rendering of the second widget configuration item set differs from the rendering of the first widget configuration item set;

receiving a second widget title creation request in response to user interaction with the widget title creation interface component of the second widget configuration interface;

receiving a second widget configuration item selection request in response to user interaction with the widget configuration item selection interface of the second widget configuration interface;

receiving a second object type selection request in response to user interaction with the object type selection interface of the second widget configuration interface, the second object type selection request corresponding to the selected object type identifier;

receiving an accessibility selection request in response to user interaction with the accessibility selection interface of the second widget configuration interface;

generating a second widget component interface template based at least in part on the received creation and selection requests, the second widget component interface template comprising a widget title component, at least one widget content interface component, and at least one accessibility component, storing the generated second widget component interface template in association with the second user identifier and the selected object type identifier in the widget component interface template repository, such that each of the generated first widget component interface template and the generated second widget component interface template corresponds to the selected object type identifier.

16. The method of claim 15, wherein at least one of the one or more widget configuration items of the widget configuration item selection interface of the first widget configuration interface comprises a widget configuration item suggestion, the widget configuration item suggestion determined based on user profile data, historical widget interaction data, or combinations thereof.

17. The method of claim 15, wherein the widget configuration item selection interface of the first widget configuration interface comprises at least one widget configuration item associated with a first pre-defined widget component and at least one widget configuration item associated with a second pre-defined widget component.

18. The method of claim 15, the method further comprising:
receiving a first widget configuration item suggestion request;
determining one or more widget configuration item suggestions; and
rendering at least one of the one or more widget configuration item suggestions to the widget configuration item selection interface of the first widget configuration interface.

19. The method of claim 18, wherein determining one or more widget configuration item suggestions comprises:
retrieving user profile data associated with the first user identifier from a user profile repository, wherein the user profile data comprises user role data;
identifying a plurality of widget configuration item suggestions based on the user role data;
ranking the plurality of widget configuration item suggestions; and
selecting the one or more widget configuration item suggestions based on the ranking of the plurality of widget configuration item suggestions.

20. The method of claim 15, wherein rendering the first widget component to the visual display of the computing device associated with the first user identifier such that the first widget component is accessible via the external application comprises:
receiving a widget component display request comprising the first user identifier and an object identifier
retrieving the first widget component interface template associated with the first user identifier from the widget component interface template repository, wherein the first widget component interface template comprises a first widget component interface template identifier;
retrieving a first object data subset associated with the selected object identifier and the first widget component interface template identifier from an object data repository;
dynamically instantiating the first widget component interface template with the retrieved first object data subset by programmatically mapping the first object data subset to one or more particular widget fields in the first widget component interface template; and
rendering the dynamic instantiation of the generated first widget component interface template to the first widget component on the visual display of the computing device associated with the first user identifier such that the first widget component is accessible via the external application.

21. The method of claim 15, wherein a second widget component is rendered to an interface in accordance with the at least one accessibility component associated with the second widget component interface template.

22. The method of claim 21, wherein the second widget component is rendered to a dashboard interface.

23. The method of claim 21, wherein the second widget component is rendered to an object page interface.

* * * * *